US005586997A

United States Patent [19]

Pall et al.

[11] Patent Number: 5,586,997
[45] Date of Patent: *Dec. 24, 1996

[54] BAG FILTER

[75] Inventors: David B. Pall, Roslyn Estates; James T. Connors, Jr., Groton, both of N.Y.

[73] Assignee: Pall Corporation, East Hills, N.Y.

[*] Notice: The term of this patent shall not extend beyond the expiration date of Pat. No. 5,582,907.

[21] Appl. No.: 389,264

[22] Filed: Feb. 16, 1995

Related U.S. Application Data

[63] Continuation-in-part of Ser. No. 281,772, Jul. 28, 1994.

[51] Int. Cl.⁶ ............................................. B01D 46/02
[52] U.S. Cl. ........................... 55/361; 55/382; 55/527; 95/273; 210/505; 210/767; 210/799; 428/34.3; 428/903
[58] Field of Search ................................ 428/34.3, 35.2, 428/903; 210/448, 452, 508, 767, 55, 96, 483, 505, 799; 55/527, 361, 382; 95/273

[56] References Cited

U.S. PATENT DOCUMENTS

| | | |
|---|---|---|
| 2,399,258 | 4/1946 | Taylor . |
| 2,574,221 | 11/1951 | Modigliani . |
| 2,656,873 | 10/1953 | Stephens . |
| 2,664,375 | 12/1953 | Slayter . |
| 2,785,442 | 3/1957 | Boggs . |
| 2,939,761 | 6/1960 | Stein . |
| 3,051,602 | 8/1962 | Schairbaum . |
| 3,134,704 | 5/1964 | Modigliani . |
| 3,266,966 | 8/1966 | Patchell . |
| 3,314,840 | 4/1967 | Lloyd et al. . |
| 3,412,865 | 11/1968 | Lontz et al. . |
| 3,438,587 | 4/1969 | Jackson, Jr. . |
| 3,441,468 | 4/1969 | Siggel et al. . |
| 3,459,613 | 8/1969 | Copenhefer et al. . |
| 3,477,892 | 11/1969 | Plymale . |
| 3,490,975 | 1/1970 | Lightwood et al. . |
| 3,506,420 | 4/1970 | Jackson, Jr. et al. . |
| 3,526,557 | 9/1970 | Taylor, Jr. . |
| 3,579,403 | 5/1971 | Stroop . |
| 3,595,245 | 7/1971 | Buntin et al. . |
| 3,615,995 | 10/1971 | Buntin et al. . |
| 3,650,866 | 3/1972 | Prentice . |
| 3,676,239 | 7/1972 | Soehngen . |

(List continued on next page.)

FOREIGN PATENT DOCUMENTS

| | | |
|---|---|---|
| 313348 | 4/1989 | European Pat. Off. . |
| 397403 | 11/1990 | European Pat. Off. . |
| WO94/09200 | 4/1994 | European Pat. Off. . |
| 54-046811 | 4/1979 | Japan . |

OTHER PUBLICATIONS

Schwarz, "New Concepts in Melt–Blown Design Applied to Microfibers, Co–Spun and Co–Extruded Producgs" (Mar. 1987), presented at Int'l. Nonwovens Tech. Conference (Hilton Head, SC, May 1987), pp. 206–220.

"Breakthrough in Nonwoven Webs Made by Improved Melt–Blowing Process," Biax–Fiberfilm Corporation Technical Bulletin 10B, Neenah, WI.

"Melt–Blown," J and M Laboratories, Inc. Brochure, Dawsonville, GA.

Primary Examiner—James J. Bell
Attorney, Agent, or Firm—Leydig, Voit & Mayer, Ltd.

[57] ABSTRACT

The present invention provides a bag filter comprising a melt-blown fibrous nonwoven web formed into a bag configuration with a closed end, an open end, an inside surface, and an outside surface. The bag filter is constructed such that (a) the fibrous nonwoven web comprises fibers such that 90% of the fibers have a diameter ranging from a minimum fiber diameter to a maximum fiber diameter which is no more than about three times the minimum fiber diameter, (b) the fibrous nonwoven web as oriented in the bag filter has a tensile strength in the circumferential direction at least about 1.5 times the tensile strength in the longitudinal direction, and/or (c) there is no side seam and an injection-molded thermoplastic elastomer end closure. The present invention also provides a method of treating a fluid by passing the fluid through such a bag filter.

29 Claims, 9 Drawing Sheets

U.S. PATENT DOCUMENTS

| | | |
|---|---|---|
| 3,676,242 | 7/1972 | Prentice . |
| 3,704,198 | 11/1972 | Prentice . |
| 3,705,068 | 12/1972 | Dobo et al. . |
| 3,755,527 | 8/1973 | Keller et al. . |
| 3,787,265 | 1/1974 | McGinnis et al. . |
| 3,795,571 | 3/1974 | Prentice . |
| 3,801,400 | 4/1974 | Vogt et al. . |
| 3,825,379 | 7/1974 | Lohkamp et al. . |
| 3,825,380 | 7/1974 | Harding et al. . |
| 3,833,438 | 9/1974 | Kaneko et al. . |
| 3,836,416 | 9/1974 | Ropiequet . |
| 3,849,241 | 11/1974 | Butin et al. . |
| 3,854,917 | 12/1974 | McKinney et al. . |
| 3,933,557 | 1/1976 | Pall . |
| 3,940,302 | 2/1976 | Matthews et al. . |
| 3,978,185 | 8/1976 | Buntin et al. . |
| 4,021,281 | 5/1977 | Pall . |
| 4,032,688 | 6/1977 | Pall . |
| 4,048,364 | 9/1977 | Harding et al . |
| 4,116,738 | 9/1978 | Pall . |
| 4,172,820 | 10/1979 | Lundberg et al. . |
| 4,226,751 | 10/1980 | Lundberg et al. . |
| 4,238,175 | 12/1980 | Fujii et al. . |
| 4,240,864 | 12/1980 | Lin . |
| 4,259,284 | 3/1981 | Lundberg et al. . |
| 4,340,479 | 7/1982 | Pall . |
| 4,380,570 | 4/1983 | Schwarz . |
| 4,415,608 | 11/1983 | Epperson et al. . |
| 4,416,777 | 11/1983 | Kuroda et al. . |
| 4,475,972 | 10/1984 | Wong . |
| 4,478,620 | 10/1984 | Tamura . |
| 4,552,707 | 11/1985 | How . |
| 4,594,202 | 6/1986 | Pall et al. . |
| 4,617,124 | 10/1986 | Pall et al. . |
| 4,650,506 | 3/1987 | Barris et al. . |
| 4,689,003 | 8/1987 | Schreiner et al. . |
| 4,701,267 | 10/1987 | Watanabe et al. . |
| 4,726,901 | 2/1988 | Pall et al. . |
| 4,731,215 | 3/1988 | Schwarz . |
| 4,738,740 | 4/1988 | Pinchuk et al. . |
| 4,764,324 | 8/1988 | Burnham . |
| 4,774,001 | 9/1988 | Degen et al. . |
| 4,826,642 | 5/1989 | Degen et al. . |
| 4,838,972 | 6/1989 | Daamen et al. . |
| 4,855,063 | 8/1989 | Carmen et al. . |
| 4,880,548 | 11/1989 | Pall et al. . |
| 4,889,630 | 12/1989 | Reinhardt et al. . |
| 4,925,566 | 5/1990 | Bardot et al. . |
| 4,925,572 | 5/1990 | Pall . |
| 4,936,998 | 6/1990 | Nishimura et al. . |
| 4,999,080 | 3/1991 | Boich . |
| 5,061,170 | 10/1991 | Allen et al. . |
| 5,069,945 | 12/1991 | Wrasidlo . |
| 5,079,080 | 1/1992 | Schwarz . |
| 5,089,122 | 2/1992 | Chmiel . |
| 5,102,484 | 4/1992 | Allen et al. . |
| 5,122,211 | 6/1992 | Roach . |
| 5,145,689 | 9/1992 | Allen et al. . |
| 5,156,661 | 10/1992 | Adiletta . |
| 5,160,746 | 11/1992 | Dodge, II et al. . |
| 5,205,938 | 4/1993 | Fiumano et al. . |
| 5,266,219 | 11/1993 | Pall et al. . |
| 5,273,565 | 12/1993 | Milligan et al. . |
| 5,298,165 | 3/1994 | Oka et al. . |

COMPOSITE OF I SCAN
 MAX: 3.96
 AVG: 3.91
 MIN: 3.91
 2 SIGMA: 0.00

CROSS MACHINE DIRECTION

COMPOSITE OF I SCAN
 MAX: 4.09
 AVG: 4.07
 MIN: 4.07
 2 SIGMA: 0.00

MACHINE DIRECTION

BAG FILTER

CROSS-REFERENCE TO RELATED APPLICATION

This is a continuation-in-part application of copending U.S. patent application Ser. No. 08/281,772, filed Jul. 28, 1994 now pending.

TECHNICAL FIELD OF THE INVENTION

The present invention pertains to bag filters made from melt-blown fibrous webs. The bag filters are particularly useful for the filtration of fluids.

BACKGROUND OF THE INVENTION

The properties of a bag filter are largely determined by the nature of the filter medium used in the construction of the bag filter and the manner in which that filter medium is formed into the bag filter. Thus, many of the deficiencies of a particular bag filter are the result of deficiencies inherent in the filter medium used in the bag filter and/or the bag filter construction technique (particularly as regards seam sealing).

Bag filters may be prepared from fibrous nonwoven webs. A nonuniform fibrous nonwoven web utilized in the construction of a bag filter can result in a bag filter with a nonuniform pressure drop, poor tear resistance, and/or unsatisfactory filtration efficiency. A nonuniform fibrous nonwoven web may result in the need to use multiple layers to overcome some of these deficiencies.

Various techniques of preparing melt-blown fibrous nonwoven webs have been disclosed. For example, in U.S. Pat. No. 3,825,380, the Exxon melt-blowing system is described; however, this system results in fibrous nonwoven webs with undesirable fiber roping and twinning. Both twinning and roping cause the fibrous nonwoven web to have a relatively high pressure drop and low filtration efficiency. The presence of shot, i.e., small pellets of unfiberized resin interspersed in the web, can also induce irregular pore size and be a problem with such fibrous nonwoven webs. U.S. Pat. No. 4,021,281 describes a method in which attenuated fibers are produced by a system which bears similarities to the Exxon system. The resulting fibrous nonwoven web contains many of the same deficiencies present in the fibrous nonwoven web prepared using the Exxon system.

The fibrous nonwoven webs are generally in the forms of sheets which are formed into a bag filter by folding the sheet into a tubular form, sewing together the adjoining portions and one end of the tube, typically turning the resulting bag inside-out, and then heat-sealing the seams with thermoplastic tape. The bag filters thus produced have two seams, namely a side seam and an end seam. For instance, U.S. Pat. No. 5,156,661 discloses a bag filter comprising at least one sheet of a filter medium, preferably a polypropylene high dirt capacity filter medium, formed into a bag configuration with an opening, an inside surface, an outside surface, and at least one seam formed at adjoining filter medium portions which have been sewn together, wherein the seams are sealed with a thermoplastic tape that has been heat-sealed to the adjoining filter medium portions.

Similarly, U.S. Pat. No. 5,205,938 discloses a bag filter comprising at least one sheet of a filter, preferably a polyester high dirt capacity filter medium having a graded pore structure, formed into a bag configuration with an opening, an inside surface, an outside surface, and at least one seam formed at adjoining filter medium portions which have been sewn together. The seams are optionally sealed with a thermoplastic tape that has been heat-sealed to the adjoining filter medium portions.

Bag filters produced by sewing and heat-sealing have certain deficiencies. Since the seams have been punctured by the sewing needle and are held together by the thread, the structural integrity of the seam is weakened and hence that of the bag filter itself. Moreover, sewn seams can provide fluid leakage pathways during use. In addition, the method of producing such bag filters is time-consuming and costly because of the number of steps involved when the seams are sewn and heat-sealed with a thermoplastic tape.

Some bag filters are formed by merely thermally sealing the seams, i.e., bonding the fibrous web to itself without any sewing. Although such a sealing technique avoids the need to puncture the fibrous nonwoven web with a sewing needle, the thermal sealing technique also results in two seams (namely, a side seam and an end seam) and suffers from other deficiencies. In particular, the thermal sealing technique requires the partial melting of the fibrous nonwoven web, thereby adversely affecting the structural integrity and filtering characteristics of the bag filter.

Bag filters free of a side seam have been disclosed. For example, U.S. Pat. No. 4,021,281 discloses the production of nonwoven tubular webs from which bag filters may be produced. Although the bag filters are free of side seams, one end of the tube is still subject to the usual closing steps, namely, sewing and heat-sealing with a thermoplastic tape or thermally sealing the fibrous nonwoven web to itself. Thus, there is created an end seam which has the same deficiencies as the side seam, namely, the weakened structural integrity of the bag filter, possible fluid leakage pathways, and the time-consuming steps involved in the closing.

Many bag filters have a collar attached to the open end so that the filter may be suitably positioned in the filter holder during use. The collar is generally stitched and heat-sealed to the opening of the bag filter, or merely thermally sealed directly to the bag filter at its opening, thereby creating a collar seam. For the same reasons indicated above with respect to the side seam and end seam, a collar seam can be similarly problematic.

Accordingly, there remains a need for improved bag filters. In particular, there is a need for bag filters which avoid some or all of the problems associated with nonuniform filter media and sewn or thermally sealed seams. The present invention seeks to provide such a bag filter. These and other objects and advantages of the present invention, as well as additional inventive features, will be apparent from the description of the invention provided herein.

BRIEF SUMMARY OF THE INVENTION

The present invention provides a bag filter comprising a melt-blown fibrous nonwoven web formed into a bag configuration with a closed end, an open end, an inside surface, and an outside surface. The bag filter is constructed such that (a) the fibrous nonwoven web comprises fibers such that 90% of the fibers have a diameter ranging from a minimum fiber diameter to a maximum fiber diameter which is no more than about three times the minimum fiber diameter, (b) the fibrous nonwoven web as oriented in the bag filter has a tensile strength in the circumferential direction at least about 1.5 times the tensile strength in the longitudinal direction, and/or (c) there is no side seam and an integral injection-molded thermoplastic elastomer end closure. The present invention also provides a method of treating a fluid by passing the fluid through such a bag filter.

BRIEF DESCRIPTION OF THE DRAWINGS

FIG. 6A is an end view of another melt-blowing apparatus with two rows of angled and offset fiberizing nozzles, while

DETAILED DESCRIPTION OF THE PREFERRED EMBODIMENTS

Figure 1:
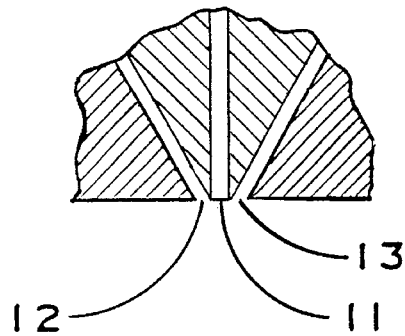
FIG. 1 is a cross-sectional view of a conventional fiberizing orifice.

The present inventive bag filter comprises a filter medium formed into a bag configuration with a closed end, an open end, an inside surface, and an outside surface. The filter medium from which the bag filter is formed comprises a melt-blown fibrous nonwoven web. The filter medium is generally in a tubular configuration which can be effected either by forming the nonwoven web into a tube during the melt-blowing process (e.g., melt-blowing the fibers onto a rotating mandrel) which avoids a side seam or by taking one or more flat sheets of the nonwoven web, forming the sheet(s) into a tube with a side seam, and sealing the seam. When a flat sheet is converted into a bag filter, a side seam, an end seam, and a collar seam (to the extent the bag filter comprises a collar) need to be sealed. When a tubular web is converted into a bag filter, there exists only an end seam and a possible collar seam which need to be sealed. Such a bag filter can be prepared from a variety of melt-blown fibrous nonwoven webs and utilize a variety of seam closure techniques.

The present inventive bag filter is desirably constructed such that (a) the fibrous nonwoven web comprises fibers such that 90% of the fibers have a diameter ranging from a minimum fiber diameter to a maximum fiber diameter which is no more than about three times the minimum fiber diameter, (b) the fibrous nonwoven web as oriented in the bag filter has a tensile strength in the circumferential direction at least about 1.5 times the tensile strength in the longitudinal direction, and/or (c) there is no side seam and an integral injection-molded thermoplastic elastomer end closure. The present inventive bag filter preferably is the result of the combination of these three features.

Fibrous Nonwoven Web

While any suitable melt-blown fibrous nonwoven web can be used to prepare a bag filter, the present inventive bag filter is preferably prepared from a melt-blown fibrous nonwoven web which is highly uniform. Such a highly uniform fibrous nonwoven web is described in U.S. patent application Ser. No. 08/281,772.

The filter medium of the present inventive bag filter preferably comprises a melt-blown fibrous nonwoven web of fibers having an average fiber diameter of less than about 2 μm, preferably less than about 1.5 μm, and more preferably less than about 1 μm. Moreover, the melt-blown fibrous nonwoven web can have a narrow distribution of fiber diameters, preferably such that 90% of the fibers of the web have a diameter ranging from a minimum fiber diameter to a maximum fiber diameter which is no more than about three times, preferably no more than about two times, and more preferably no more than about 1.5 times, the minimum fiber diameter.

The preferred melt-blown fibrous nonwoven web can be, and desirably is, characterized by a weight distribution varying by less than 1% when measured in both the longitudinal and transverse directions, with such weight distribution measured along 0.64×13 cm areas and on 2.54 cm squares. The preferred melt-blown fibrous nonwoven web is also substantially free of roping, twinning, and shot.

The preferred present inventive melt-blown fibrous nonwoven web can be, and desirably is, further characterized by a tensile strength in a first direction (e.g., the cross-machine direction (CMD) or circumferential direction of the resulting bag filter) at least about 1.5 times, preferably at least about 2 times, and more preferably at least about 4 times, the tensile strength in a second direction 90° to the first direction (e.g., the machine direction (MD) or longitudinal direction of the resulting bag filter). It is particularly advantageous to use such a melt-blown fibrous nonwoven web when the fibrous nonwoven web is oriented in the bag filter having a circumferential direction and a longitudinal direction such that the first direction (e.g., CMD) of the fibrous nonwoven web is in the circumferential direction of the bag filter and the second direction (e.g., MD) of the fibrous nonwoven web is in the longitudinal or axial direction of the bag filter. This is because the stress on the walls of the resulting bag filter due to internally applied pressure is twice as high in the tangential direction as compared with the stress in the axial direction. Thus, if the web tensile strengths are equal in both the CMD and MD directions, a failure due to internal pressure would be tangential, i.e., by a split along the length of the bag filter parallel to its axis. By using a melt-blown fibrous nonwoven web in which the fibers are oriented such as to provide a web with tangential strength about twice the axial strength, a bag filter prepared therefrom uses all of the fibers of the web to maximum advantage, will not fail prematurely, and will resist higher internal pressure.

A method of preparing the preferred melt-blown fibrous nonwoven web is disclosed in U.S. patent application Ser. No. 08/281,772 and preferably comprises extruding the molten resin from two parallel rows of linearly arranged, substantially equally spaced nozzles to form fibers onto the surface of a cylindrical collector having a longitudinal axis arranged parallel to the rows of nozzles, wherein the rows of nozzles are offset from each other and are angled toward each other. The rows of nozzles are preferably offset from each other by about one-half the spacing between the nozzles within each row and the rows of nozzles are preferably angled toward each other by substantially equal but opposite angles, e.g., each of the rows of nozzles is angled by about 25° or less, preferably about 5° to about 20°, more preferably about 10° to about 16°, from a vertical plumb line originating at the center of the cylindrical collector. The cylindrical collector can be rotated at any suitable surface velocity, generally at least about 20 m/min and preferably not exceeding about 600 m/min, although a higher surface velocity (e.g., about 1000 m/min or higher which can be obtained by rotating a 35 cm diameter cylindrical collector at about 900–1000 rpm) may produce a fibrous nonwoven web which is superior for some applications. The cylindrical collector can have any suitable diameter, preferably about 5 cm to about 150 cm, more preferably about 10 cm to about 50 cm, and most preferably about 10 cm to about 35 cm. The nozzles can be spaced any suitable distance from the cylindrical collector, preferably about 2 cm to about 10 cm, more preferably about 2 cm to about 8 cm, and most preferably about 2 cm to about 5 cm. The cylindrical collector is preferably translated at a rate not exceeding about 2 cm/revolution, more preferably at a rate not exceeding about 1 cm/revolution, and most preferably at a rate not exceeding about 0.75 cm/revolution. Within each of the rows, the nozzles can be spaced apart any suitable distance, generally about 2 cm or less, preferably about 0.25 cm to about 2 cm, more preferably about 0.1 cm to about 1.5 cm, and most preferably about 0.37 cm to about 1.2 cm, such as about 0.5 cm to about 1 cm. The parallel rows can be spaced apart any suitable distance, preferably such that the nozzle tip to nozzle tip separation between rows is about 1 to 2 cm. Moreover, the present inventive method is preferably carried out while a negative pressure is maintained between the rows of the nozzles.

Suitable methods of modifying the preferred melt-blown fibrous nonwoven web are also disclosed in U.S. patent application Ser. No. 08/281,772 and preferably comprise modifying the melt-blown fibrous nonwoven web to alter the critical wetting surface tension (CWST) of the web to between about 73 and about 100 dynes/cm. The bag filters of the instant invention can be made of such modified webs, as well as the unmodified webs.

The CWST of the web may be modified by a novel grafting procedure, in which the CWST is raised to above 73 dynes/cm by a two or three step process comprising (a) exposing the porous medium for about 10 to 30 seconds to a plasma of an inert gas, such as helium, neon, or argon at about 20 to 700 μm Hg, (b) optionally evacuating the chamber to a pressure of less than about 5 μm Hg, and then (c) introducing into the chamber liquid hydroxypropyl methacrylate or other unsaturated monomer presenting a hydroxyl, carboxyl, amine, or amide group and holding for a period of about 30 seconds or more. After filling the chamber with air, the grafted polymer may be removed and used without further processing or may be subjected to washing, e.g., water washing, to remove any unbound residual material (e.g., contaminants which were present in the monomer composition). Weight gain depends on the surface area of the porous medium. A typical value is in the range of up to about 5 to 10%. The temperature during the operation remains essentially at the ambient. Preferred monomers include hydroxypropyl acrylate (HPA) and hydroxy ethyl methacrylate (HEMA), along with other similarly functional monomers which are known to those familiar with the art of grafting. In a variation of the above described procedure the unsaturated monomer may be used to form a plasma in step (a) in place of the inert gas, with similar end results.

A remarkable feature of this grafting procedure is that, unlike other grafting procedures known to those familiar with the art, the CWST produced with HPA and HEMA is 74 to 76 dynes/cm over a wide range of concentrations and times of exposure when used to treat hydrophobic polyester substrates. Other resins can be similarly converted to form fibrous porous media and then hydrophilized as described above.

Other means to achieve a permanent graft include cobalt 60 irradiation, UV exposure, or electron beam, in each case followed by exposure to an aqueous solution of a suitable monomer, which could for example be an acrylic alcohol, which is then typically followed by washing and drying.

The melt-blown fibrous nonwoven web can be unsupported or supported, e.g., as part of a porous composite structure comprising at least one porous sheet containing thereon a melt-blown fibrous nonwoven web, preferably wherein no more than about 10%, more preferably no more than about 5%, of the pores of the porous sheet are blocked by the melt-blown fibrous nonwoven web. The melting point of the fibrous melt-blown nonwoven web is preferably lower than that of an adjoining porous sheet to assist in securing the composite together. Similarly, two porous sheets can be bound together by the melt-blown fibrous nonwoven web.

The bag filters of the present invention are made preferably from fibrous nonwoven webs which can be produced by any of the methods described in U.S. patent application Ser. No. 08/281,772. The web may be formed, as briefly described below, from a single row of individual nozzles, from a multiple row arrays of fiberizing nozzles, by the crossed fiber system, or by, most preferably, the scanning system.

Fiberizing Nozzles

In the widely practiced Exxon melt-blowing process, molten resin, for example molten polypropylene, is extruded through a row of linearly disposed holes of diameter about 0.35 to 0.5 mm. The holes are drilled in linear array on about 1 to 2 mm centers into a flat surface about 1 to 2 mm wide, with the surface being located as shown in FIG. 1 at the apex of a member having a triangular cross section, and with the angles at the apex being about 45° to 60° to the center line. Surrounding the apex 11 as shown in FIG. 1 are two slots 12, 13, one on each side, through which is delivered heated air, which attenuates the molten resin extruded through the holes, thereby forming a stream of fibers. The fibers are collected on one side of a moving screen which is separated from the nozzle tips by about 10 cm or more, with the other side of the screen being connected to a suction blower. In operation, most of the fibers are collected on the screen to form a low density web with a rough surface; however, a significant proportion of the fibers escape into the surroundings, and a suction hood into which they are collected and sent to waste is provided.

Figure 2:
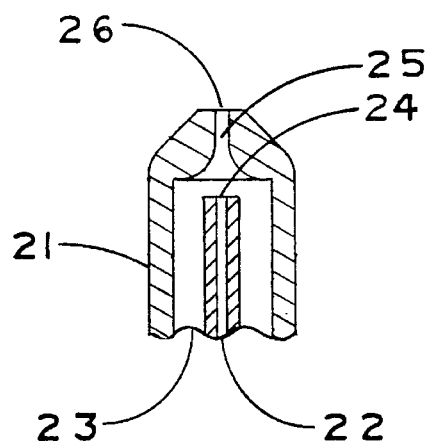
FIG. 2 is a cross-sectional view of a preferred fiberizing nozzle.

An improved fiberizing nozzle is depicted in FIG. 2, wherein the fiberizing nozzle 21 contains a capillary 22 through which the resin is pumped and a circular annulus 23 through which hot air is delivered. The pumped resin exits the capillary 22 into the resin disruption zone 24 and then into the nozzle channel 25 where the resin, now fragmented into tiny droplets, is carried in the air stream out of the nozzle tip 26.

Because the air supply is used more efficiently and is correspondingly less in proportion to the weight of the product web, the fiberized product of the present invention can be collected as a web by impinging it on a solid collecting surface, as opposed to the vacuum backed screen of the Exxon apparatus. In another marked improvement on the prior art, the DCD (distance between the nozzle tip 26 in FIG. 2 and the target collecting surface) may be shortened to under about 2.8 to 5.5 cm, i.e., about one half or less than used for the Exxon system, thereby reducing the width of the fiber stream and further improving fiber collection efficiency.

A Single Row Of Individual Nozzles

Figure 3:
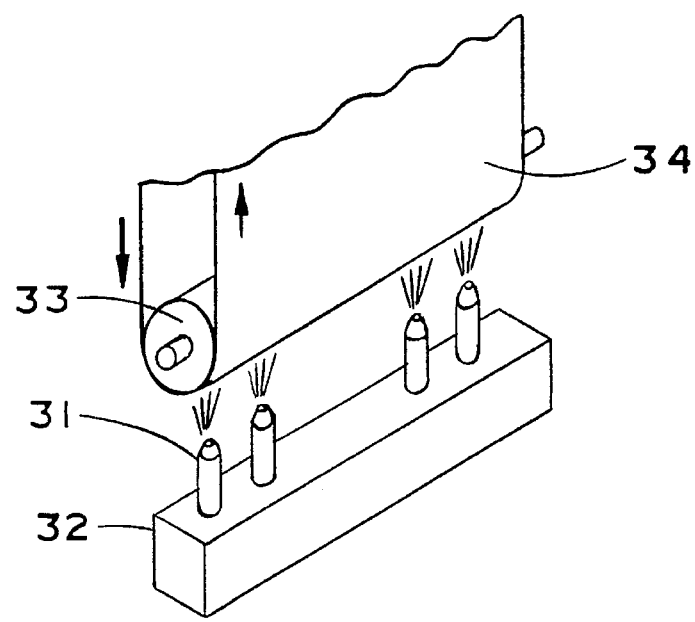
FIG. 3 is a perspective view of a melt-blowing apparatus with a single row of fiberizing nozzles.

An arrangement for collecting a fibrous web from a single row of individual fiberizing nozzles (of the type described above and depicted in FIG. 2) is shown in perspective view in FIG. 3, with each fiberizing nozzle 31 being connected to a double manifold 32, one portion of which is arranged to supply molten resin to the nozzles from an extruder and the other portion to supply heated air at controlled temperature and pressure. The nozzles 31 are arranged in a single line, spaced apart from each other by a distance which is preferably in the range between about 0.4 and 1.5 cm and more preferably in the range of about 0.6 to 1.2 cm. This arrangement, as one might expect, yields a striped product, which nevertheless has properties substantially superior to the products of the Exxon system with respect to better fiber conformation, and has the ability to make finer fibers which in use remove smaller particles and have longer life in service.

The webs formed by the apparatus of FIG. 3 may be thick enough and sufficiently coherent to permit formation directly onto the outer surface of cylinder 33, from which they can be withdrawn continuously in the manner of U.S. Pat. No. 4,021,281; however, it may be expedient, particularly when the web weight is less than about 3 to 10 milligrams per square cm, to have the web collected on the surface of a supporting fabric 34 which may for example be an inexpensive nonwoven, permitting the product to be collected, stored, and later used with the fabric in place or separated from the fabric prior to use.

Multiple Row Arrays Of Fiberizing Nozzles

Figure 4B:
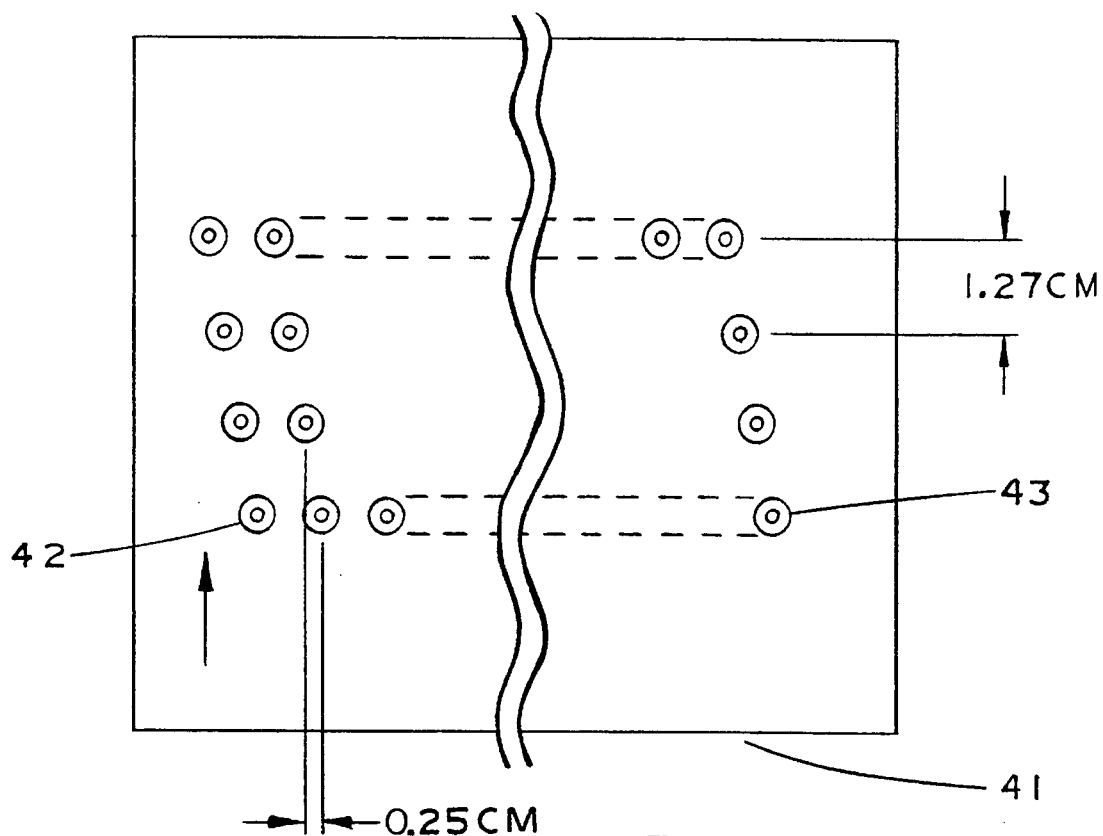
FIG. 4B is an enlarged plan view of the same apparatus depicted in FIG. 4A as seen along line 4B—4B of FIG. 4A.
Figure 4A:
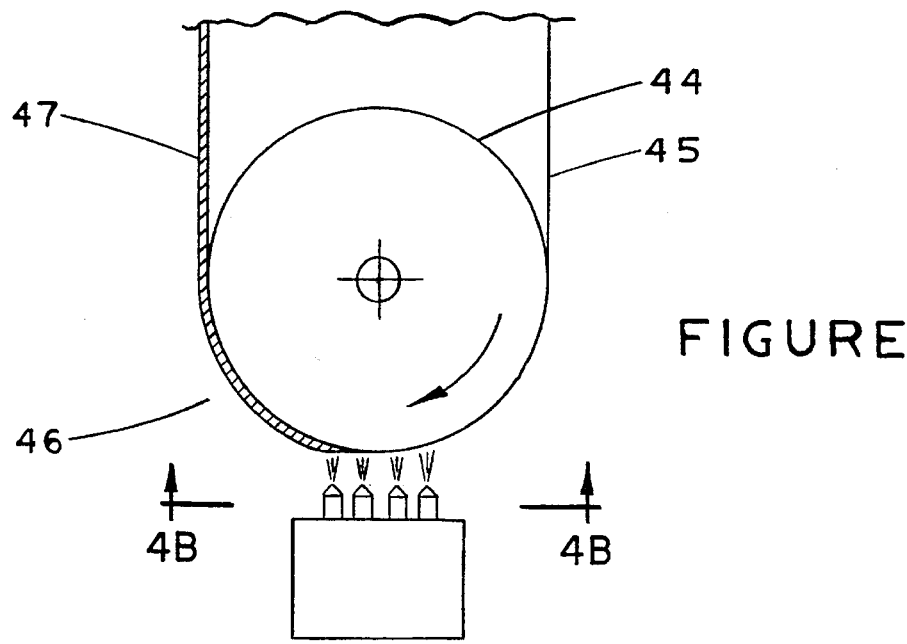
FIG. 4A is an end view of a melt-blowing apparatus with four rows of fiberizing nozzles.

An apparatus which was used in an attempt to reduce or to eliminate striping is shown in FIGS. 4A and 4B, where FIG. 4A is an end view of an apparatus differing from that of FIG. 3 only in the substitution of a fiberizer assembly with four rows of fiberizing nozzles, and FIG. 4B is an upwardly facing section along the line 4B—4B of FIG. 4A. In FIG. 4B, 41 refers to the collection surface, while 42–43 delineates a row of 106 linearly located fiberizing nozzles in which the fiberizing nozzles are spaced apart by 0.25 cm, 42–43 being one of four such rows, the rows being spaced apart from each other by 1.27 cm. In FIG. 4A, 44 is a rotating cylinder, around 180° of which travels a 110 cm wide smooth surfaced nonwoven fabric 45. The fabric is impinged upon by the fiber streams 46 from the 4×106=424 fiberizing nozzles 42–43 in the manner shown in FIGS. 4A and 4B, thus forming a porous medium 47 carried by the fabric 45, from which the porous medium may be removed and separately rerolled.

As fabric 45 travelled over the rotating cylinder 44, it was impinged upon by 424 fiber streams 46, each stream originating from a nozzle spaced 0.25 cm from its diagonal neighbor. Since each fiber stream could be seen visually to lay down a swath about 0.5 cm wide as it struck the surface of the fabric 45, and since the nozzles were on 0.25 cm centers, it was anticipated that a uniform or nearly uniform fiber distribution would be obtained, thus diminishing or eliminating striping; instead the striping was accentuated from that obtained with a single row die. The stripes were spaced 1 cm apart, with the more transparent portions containing about one half the quantity of fiber contained in the less transparent portions.

Careful visual observation of the fiber streams while the apparatus was being operated revealed that as the fabric 45 to which the fiber streams were directed moved over the die in the direction of the arrows depicted in FIGS. 4A and 4B, the fiber stream originating from the first row of 106 dies 42–43 impinged on the fabric and formed 106 ridges of fibers, each of which caused the 106 fiber streams from the following three rows to be deflected from the vertical direction of the nozzle from which they originated in a manner such as to deposit a proportion of their fibers on the ridges made by the first row, thus enlarging the already deposited ridges of fibers rather than starting new ridges. To review, referring again to FIGS. 4A and 4B, with the fabric moving in the direction of the arrows, nozzles 42–43 deposited ridges which were located where one would expect, i.e., in line with the nozzles; however, the fiber streams from all of the other nozzles were visibly deflected towards the ridges made by the first row of nozzles 42–43, the last of the four rows surprisingly being deflected a full 0.75 cm. In this manner a product web was obtained which was heavily striped on 1 cm centers.

The aerodynamics which might account for this unexpected behavior have not been explained quantitatively, but qualitatively a consequence of Bernoulli's theorem can be applied, i.e., a rapidly moving stream of gas is deflected towards an adjacent solid surface, in this case toward the ridges formed by the leading row of fiberizing nozzles.

Crossed Fiber Streams

Figure 5:
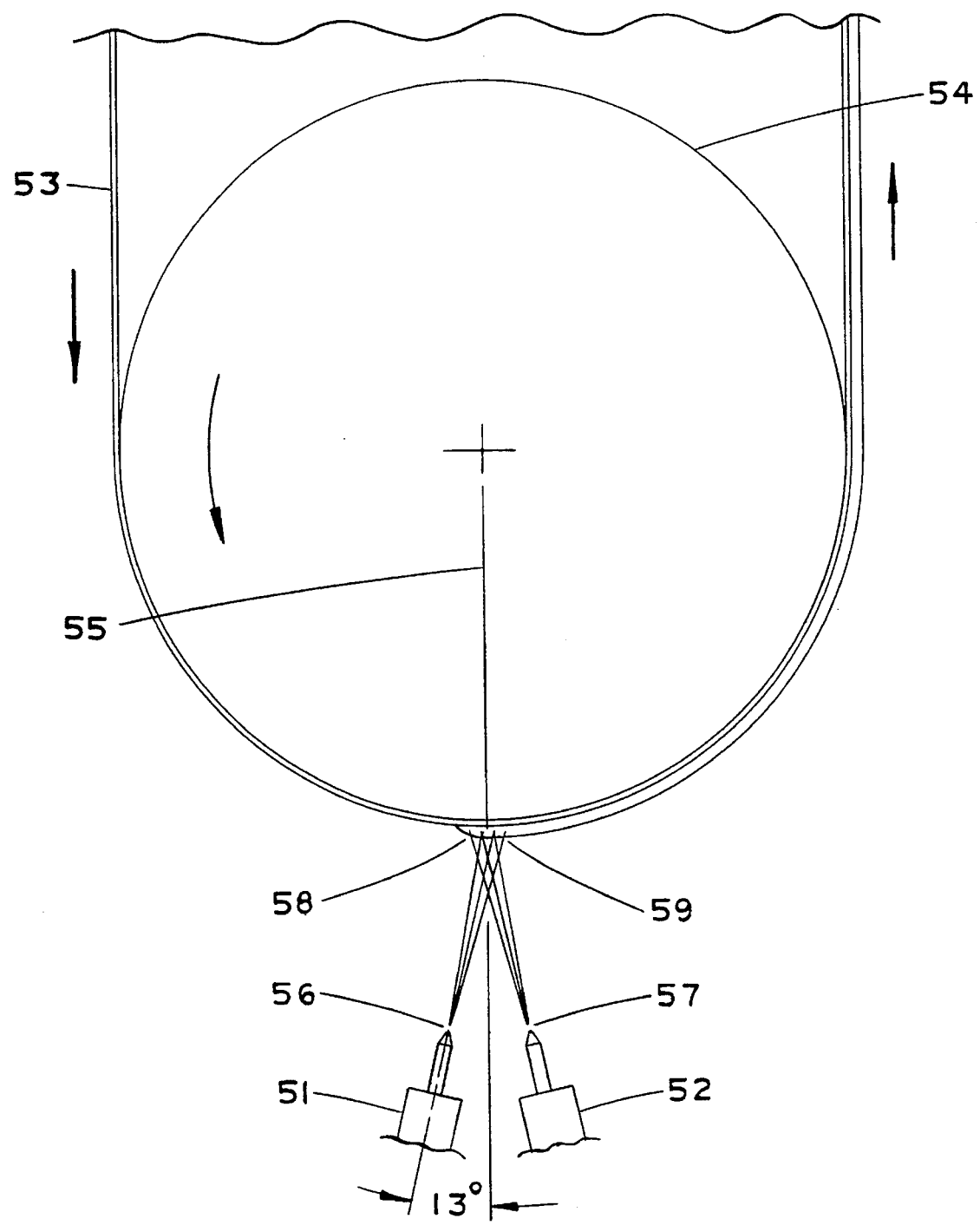
FIG. 5 is an end view of a melt-blowing apparatus with two rows of angled and offset fiberizing nozzles.

An end view of a configuration of a crossed fiber stream melt-blowing system of the present invention is shown in FIG. 5, in which 54 is a rotating cylinder over which a fabric 53, typically a disposable nonwoven is drawn, moving counterclockwise around the metal cylinder 54 towards a rewind station, which is not shown. Double manifold 51, of length a few centimeters less than the width of web 53, feeds hot air and molten resin to a row 56 of fiberizing dies tilted towards the right relative to vertical plumb line 55 drawn from the center of cylinder 54, generating fiber streams which strike the collector cylinder at 59. A matching set comprising manifold 52 and nozzles 57 is tilted towards the left and deposits resin on the collector surface at 58; if the axial spacing (perpendicular to the paper) between adjacent nozzles is distance D, then the two rows of nozzles are offset from each other by distances 0.5 D, thus the fiber streams cross each other. The distance 58–59 by which they overlap may in the practice of the invention be as much as 1 cm or more. The distance 58–59 may be zero, and a limited negative lap (separation) may be acceptable in some circumstances. Over the whole range of overlap, from 1 cm or more to a negative lap, no interference between adjacent fiber streams can be visually detected, an observation very much contrary to the results described above for multiple rows of nozzles. As a result, media made using the crossed fiber stream system are more uniform, and, while not eliminated, striping is reduced.

The degree of overlap is determined in part by the DCD. With a 15 cm diameter collection cylinder and an angle between the two sets of nozzles of 26°, and the distance between the nozzle tips 56–57 set to 1.4 cm, a preferred overlap is about 0.5 cm for a relatively large DCD of 6 to 7 cm, and between about 0.23 cm to zero overlap for relatively smaller DCDs of about 4 to 2.8 cm.

In general, the DCD is smaller when a porous medium of higher density with lower voids volume and higher tensile strength is desired. The DCD of the processes of the invention ranges from about 2.5 cm to about 7.5 cm. Parameters other than DCD which can be varied to produce a desired product include the angles of tilt, the distance from die tip 56 to die tip 57, the offset if any from the center line of the matched fiberizer set to the center vertical plumb line 55 of the collection cylinder, and the temperature, flow rates, and fiberizing characteristics of the resin which is being fiberized, as well as the volume, temperature, and pressure of the air delivered to the fiberizing nozzles.

Throughout the many variations of operating conditions described above, the crossed fiber system has been consistent in showing no interaction between neighboring product streams; the fibers generated by this system collect on the target surfaces in exactly the manner expected for a system of a given geometry.

The Scanning System

Figure 6C:
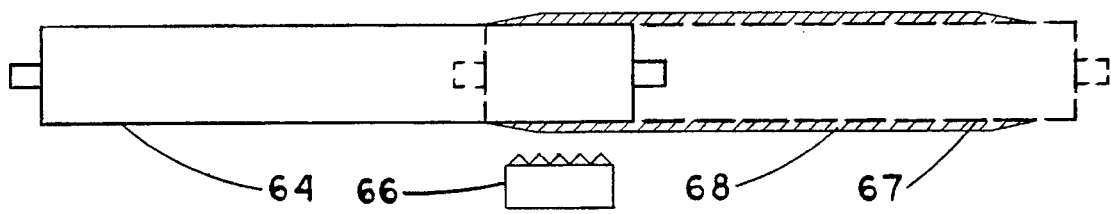
FIG. 6C is a side view of a melt-blowing apparatus showing the translation of the collecting cylinder.
Figure 6B:
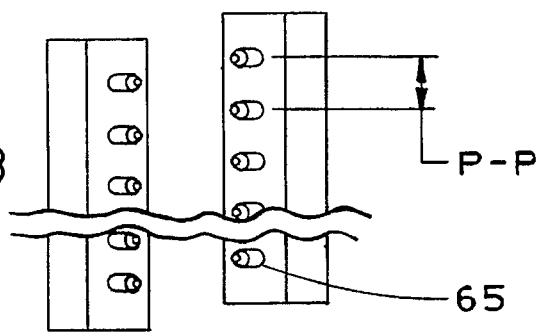
FIG. 6B is a top view of the same apparatus as seen along line 6B—6B of FIG. 6A.
Figure 6A:
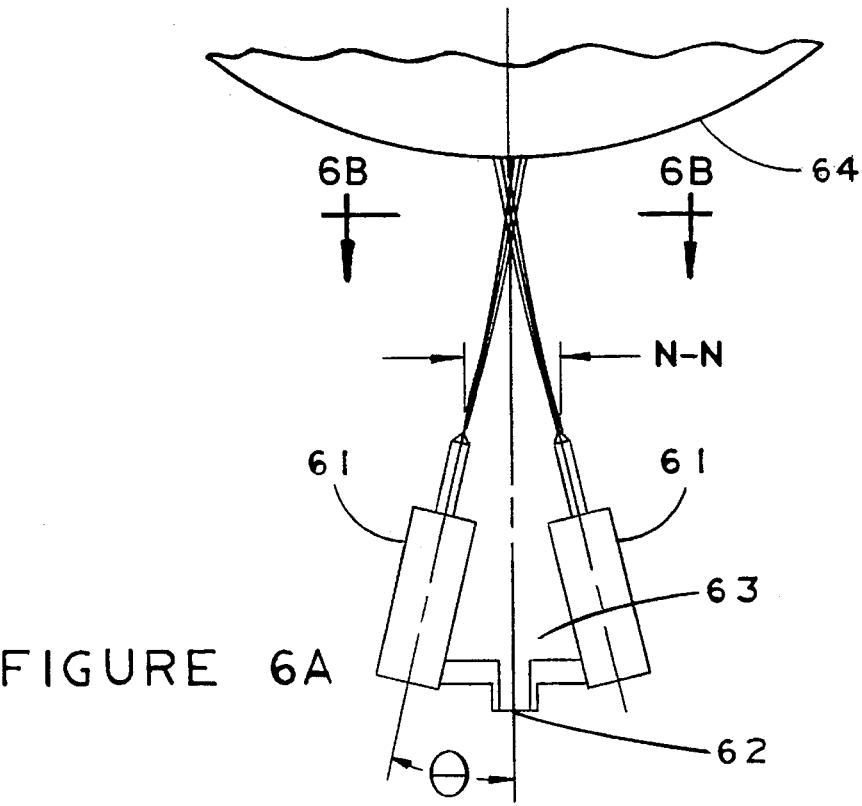

FIGS. 6A–6C depict the scanning system of the present invention. In FIG. 6A the manifolds 61 are located similarly to and have the same function as manifolds 51 and 52 of FIG. 5. The area between the two manifolds has been enclosed at the bottom and at both ends to form a cavity 62 fitted at its lower end with a cylindrical opening 63. Cylinder 54 of FIG. 5 has been replaced by cylinder 64, and fabric 53 has been removed. FIG. 6B is a partial view along line 6B—6B in FIG. 6A, showing tilted nozzles 65 located on P—P centers, the nozzles of the one row offset by 0.5 P from those of the other row. FIG. 6C shows in elevation view a crossed stream fiberizer assembly 66 located near to the right end of collector cylinder 64.

In use the fiberizer assembly 66 is stationary while collector cylinder 64 is rotated, for example at a surface velocity in the range of about 20 to 600 meters per minute, and may be simultaneously translated in the range of about 0.01 to 0.1 cm per revolution. The rotation and translation rates are maintained constant while collector cylinder 64 is moved across the fiberizer to position 67 shown in broken lines, in the course of which a fibrous web 68 is formed by the impinging fibers. The web grows in length until the translation is complete and the whole surface of the collector cylinder is covered. The cylinder of porous medium may then be slit along its length, and its ends trimmed. The so formed sheet may be inspected on a light box where it is seen to be uniform and free of any visually detectable striping.

If while using the crossed fiber streams of the invention the translation per revolution (hereinafter T/R) is increased above 0.1 cm per revolution in about 0.04 cm or smaller increments while holding constant a given combination of fiberizing nozzle dimensions, nozzle placement, DCD, mandy. el diameter, mandrel rotation rate, and resin composition, and each so made specimen is then examined sequentially on a light box, a T/R will be reached at which the existence of parallel stripes in the product becomes readily apparent. By then backing off from that T/R by about 0.04 cm, a product of excellent uniformity is produced, and such a product is encompassed by the present invention. Products made using the crossed fiber streams of the invention which show faint or moderate striping may still be superior with respect to uniformity when compared with products of any previous melt-blowing method; such products are also encompassed by the present invention.

The magnitude of the T/R which produces a strip-free product is influenced by factors including the nozzle-nozzle spacing, which is preferred to be as small as is practical; fiberizing die assemblies with a 0.76 cm nozzle center to nozzle center spacing have been used to produce the examples of the invention, as preceding tests using similar apparatus spaced on 1.02 cm spacing were less successful. Under some circumstances, for example when operating with very large DCD's, stripe-free products may be obtained with nozzle spacing well over 1 to 2 cm, and such products fall within the scope of the present invention. Spacing less than 0.76 cm is desirable and may be possible, albeit such reduction would be somewhat restricted by design considerations such as the dimension of air and resin flow passages. Other criteria for achieving perfect uniformity are that rates of revolution, translation, and resin delivery must be constant throughout the formation of the entire length of the sheet.

Most of the examples of the present invention were performed using convenient T/R values which were a fraction, for example less than one quarter to one half of the maximum T/R. In an experiment dedicated to exploring the maximum T/R possible, in which the air nozzle diameter was a relatively large 0.17 cm, the air temperature was 310° C., 305° C. resin was delivered at 0.51 g/min/nozzle and DCD was 4.1 cm, excellent uniformity on light box inspection was obtained in the T/R range from 0.12 to 0.44 cm, and uniformity remained almost as good up to T/R of 0.63 cm, with visible stripes appearing in the product at 0.76 cm.

In other experiments at various fiberizing conditions the onset of stripy conditions was seen to occur at much lower values. Occasionally conditions were such that striping appeared at a lower value, and then disappeared as the T/R was further increased up to about 0.29 cm (0.375× the 0.76 cm nozzle spacing), and a further "node" at which the product improved has been observed at 0.48 cm (0.625× the 0.76 cm nozzle spacing).

Prior to the conception of the crossed fiber stream system for delivering fibers to a translating cylinder, attempts were made to use the translating cylinder with other types of fiber delivery systems, including single and double rows of nozzles (not crossed) with the same fiberizing nozzles and with alternate nozzles. None of these yielded other than clearly striped product.

Other fiberizing systems, for example those based on the Exxon process, may yield unstriped product but such products are inferior with respect to uniformity of fiber diameter, weight distribution, and freedom from shot, twinning and roping, and are incapable of making media with average fiber diameters below about 3 to 5 µm.

By changing orientation, location, and geometry of the crossed stream fiberizers, changing resin flow rate, air flow rate, and temperature, and using nozzles with larger or smaller orifices, media can be made which as taken off of the machine have an average fiber diameter from less than 1 µm to more than about 20 to 50 µm, with a range of voids volumes from about 60% to about 94% and a range of thicknesses from less than 0.008 cm to 0.5 cm or more, all with good tensile properties, controlled pore size, thickness, fiber orientation, and voids volume. When used as filters, so made media provide particle removal ratings as measured by the OSU (Oklahoma State University) test from 1 µm to 200 µm or more. Long life in service is obtained using these media due to their high voids volume and resistance to compression as the collected solids cause pressure to build up across the filter.

Referring to FIG. 6A, the locations of the fiberizing nozzles is preferred to be such that the distance N—N between the nozzle tips is in the range from about 0.5 to 3 cm, and more preferred to be in the range of about 1 to 2 cm, and still more preferred to be in the range of about 1.2 to 1.6 cm, and it is preferred that the angle θ between the nozzle and the vertical plumb line from the center of the collector cylinder be within about 5° or less of equal but of opposite direction for both dies, and it is further preferred that the angle θ be in the range of about 3° to 25°, and more preferred to be in the range of about 5° to 20°, and still more preferred to be in the range of about 10° to 16°. The volume and type of fibers issuing from each side is usually preferred to be equal; however, products of interest for special purposes may be made by operating each side using different conditions, for example to combine high mechanical strength with very small fiber diameter.

The deposited porous medium may be calendared to reduce the pore size to provide a filter medium with an absolute removal rating of less than 0.5 μm as measured by the methods described in the U.S. Pat. No. 4,340,479.

The collector cylinder 64 of FIGS. 6A and 6C may be surfaced by a suitable release coating. Depending on the thickness, voids volume, and other characteristics of the porous medium, a tubular cylinder of porous medium may then be withdrawn from the collector cylinder and used for example as a filter with the flow from inside to out, or it may be pleated to form a seamless pleated filter element.

The crossed fiber stream arrangement is preferred to be used as the fiber generator with the scanning system of the invention because it permits high translation rates together with high fiber deposition rates while minimizing fiber loss due to overspray, and, because unlike arrays in which the nozzles are parallel, it can be used to make very uniform fibrous products with a very wide range of characteristics with precise lot to lot reproducibility. The media so made are uniform within the sensitivity of the tests which can be applied, such as weight per unit of area, thickness, voids volume, pore size, wicking rate, and particle removal capability.

Referring again to FIG. 6A, a useful mode of operation is achieved by attaching at connection 63 means to generate within chamber 62 a negative pressure in the range from zero to about 3" of water column, thereby achieving a more uniform product (as may be seen in example 44). Further, while it is an advantage of the crossed fiber stream system that both sets of fiber streams impinge on the collector cylinder on or close to a straight line, thus helping to minimize fibers which are not collected, nevertheless, when operating at relatively high air flow rates, the volume of air reaching the cylinder may be so high that some of the fibers bypass the collector cylinder, and are lost into the exhaust duct. Negative pressure applied to chamber 62 acts to prevent or diminish bypassing and to reduce loss of fibers to waste.

The melt-blown fibrous nonwoven media used to prepare the present inventive bag filters can comprise a wide variety of polymers including polyethylene terephthalate, polybutylene terephthalate (PBT), polypropylene, polyethylene, polymethylpentene, polychlorotrifluoroethylene, polyphenylsulfide, poly(1,4-cyclohexylene dimethylene terephthalate), PETG, a polyester polymerized with an excess of glycol, nylon 6, nylon 66, nylon 612, nylon 11, and a nylon 6 copolymer described as "80% nylon 6 with 20% polyethylene-oxide-diamine."

EXAMPLES

Fibrous Nonwoven Media

The following examples illustrate the method of preparation of the fibers and nonwoven webs from which the bag filters of the present invention are preferably prepared as described above.

Examples 1–6

In order to prepare the porous medium of example 1, the scanning system was operated with a fiberizer assembly comprising two fiberizers each with 21 fiberizing nozzles with air apertures 0.13 cm in diameter supplied with air at 304° C. and 0.39 kg/cm² pressure. The two fiberizers, each with 21 nozzles on 0.76 cm centers were offset axially from each other by 0.38 cm, and were angled towards each other at an inclination of 13° from the vertical, with the distance N—N of FIG. 6B set at 1.42 cm. The two sets of intersecting fiber streams delivered polybutylene terephthalate (hereinafter PBT) resin at 293° C. at the rate of 0.44 grams per minute per nozzle. The fiber streams impinged over a distance of 4.1 cm (i.e., DCD=4.1 cm) on a 15 cm diameter by 137 cm long collection cylinder which was rotated at 512 rpm while it was simultaneously translated axially at the rate of 0.2 cm per revolution for the length of a single 124 cm stroke, thereby depositing on the surface of the collector cylinder in 1.2 minutes 0.0043 grams per cm² of fibrous porous medium which was then slit lengthwise, trimmed at both ends, and then removed from the cylinder, thereby forming a sheet 47.5 cm wide by 102 cm long.

The air pressure and the DCD were then varied to produce five additional sheets with results as presented as examples 1–6 in Table I. All of the so formed sheets were examined on a light box, and were seen to be stripe-free and uniform. The sheets were very easy to manipulate, and could be stacked and removed repeatedly with no pilling or other visible surface disruption. No dimensional changes occurred during a three month storage period in a mixed stack of 24 sheets. This degree of dimensional stability is quite remarkable for a plastic product in some of which the solids content is as low as 8% by volume, with the remainder being air.

TABLE I

| | Test Conditions | | | Product Characteristics | | | | | |
| | | | | | Average | | | | |
| | Air | | | Voids | Fiber | Tensile Properties | | | |
| Example No. | pressure (kg/cm²) | DCD (cm) | Thickness (cm) | Volume (%) | Diameter (μm) | Strength (glc)[1] | | Elongation (%) | |
| | | | | | | CMD[2] | MD[3] | CMD | MD |
| --- | --- | --- | --- | --- | --- | --- | --- | --- | --- |
| 1 | 0.39 | 4.1 | 0.0185 | 82.5 | 4.2 | 230 | 90 | 5.0 | 5.0 |
| 2 | 0.79 | 4.1 | 0.029 | 89 | 1.1 | 510 | 130 | 9.7 | 14.7 |

TABLE I-continued

| | Test Conditions | | | Product Characteristics | | | | | |
| | | | | | Average | | | | |
| | Air | | | Voids | Fiber | Tensile Properties | | | |
| Example | pressure | DCD | Thickness | Volume | Diameter | Strength (glc)[1] | | Elongation (%) | |
| No. | (kg/cm$^2$) | (cm) | (cm) | (%) | (µm) | CMD[2] | MD[3] | CMD | MD |
|---|---|---|---|---|---|---|---|---|---|
| 3 | 1.06 | 4.1 | 0.054 | 94 | 1.0 | 440 | 110 | 8.5 | 13.5 |
| 4 | 1.06 | 3.6 | 0.042 | 92 | 0.9 | 500 | 150 | 8.0 | 13.2 |
| 5 | 1.06 | 3.0 | 0.027 | 88 | 1.0 | 440 | 200 | 6.8 | 11.3 |
| 6 | 1.06 | 2.8 | 0.021 | 84.2 | 1.2 | 390 | 240 | 6.0 | 84 |

[1]grams per linear centimeter.
[2]cross machine direction - perpendicular to the length of the sheet
[3]machine direction - parallel to the length of the sheet All of the examples 1 to 6 exhibit the low lateral flow times which are a desirable feature of the invention. Examples 3, 4 and 5 have RMS average fiber diameters respectively of 1.0, 0.9 and 1.0 µm (arithmetic averages 0.9, 0.8 and 0.9 µm), and are believed to be smaller in average fiber diameter compared with any melt-blown product currently or previously commercially available. Examples 5 and 6 are distinguished by their capability to remove very fine particles from liquid suspensions passed through them; using the F-2 test developed at Oklahoma State University (OSU) and since adopted as a standard by a wide range of industries dealing with liquids such as fuels, lubricating oils, and liquid food products, the media of example 6 have been shown to remove particles larger than one micrometer in diameter in a single pass at low pressure drop with long service life and particle removal efficiency in excess of 99.9%.

All of the six examples have substantially higher tensile strength in the cross machine direction (i.e., perpendicular to the long (102 cm) direction of the sheet, hereinafter referred to as the CMD), compared with their tensile strength in the machine direction (MD); for examples 2, 3, and 4 the ratio of the tensile strength is approximately 4:1. This reflects the degree of directional orientation of the fibers. An example of a more highly directional medium made using the procedures of the present invention may be seen in the SEM photo of FIG. 7.

The data of Table I were obtained using a single pass across the collection cylinder; however, multiple passes may be used by reciprocating the collection cylinder to the end of its stroke and back, often to advantage, for example when collecting thick webs, where the use of multiple passes provides the ability to adjust the DCD to allow for the thickness of the medium collected. In this way webs, or perhaps more properly battings, of uniform structure up to one or more centimeters in thickness may be made.

Example 7

In order to prepare the porous medium of example 7, the scanning system of the invention was operated with a fiberizer assembly comprising two fiberizers each with 21 fiberizing nozzles with air apertures 0.106 cm in diameter supplied with air at 332° C. and 0.74 kg/cm$^2$ pressure. The two fiberizers, each with 21 nozzles on 0.76 cm centers were offset axially from each other by 0.38 cm, and were angled towards each other at an inclination of 13° from the vertical, with the distance N—N of FIG. 6A set at 1.42 cm, and the DCD (die to collector distance) =3.3 cm. The two sets of intersecting fiber streams were supplied with 318° C. polypropylene resin at the rate of 0.134 grams per minute per nozzle. The fiber streams impinged on a 15 cm diameter by 137 cm long collector cylinder which was rotated at 175 rpm while it was simultaneously translated axially at the rate of 0.11 cm per revolution for the length of a single 125 cm stroke, thereby depositing on the surface of the collector cylinder in 6.5 minutes 0.054 g/cm$^2$ of fibrous porous medium, which was then slit lengthwise, trimmed at both ends, and removed from the cylinder, forming a sheet 47.5 cm wide by 102 cm long. The so produced 0.0054 g/cm$^2$ sheet was 0.056 cm thick and had a voids volume of 89%, a linear average fiber diameter of 0.8 micrometers, and a root mean square diameter of 0.9 µm (hereinafter all average diameters will be reported as root mean square (RMS) diameters).

Figure 7:
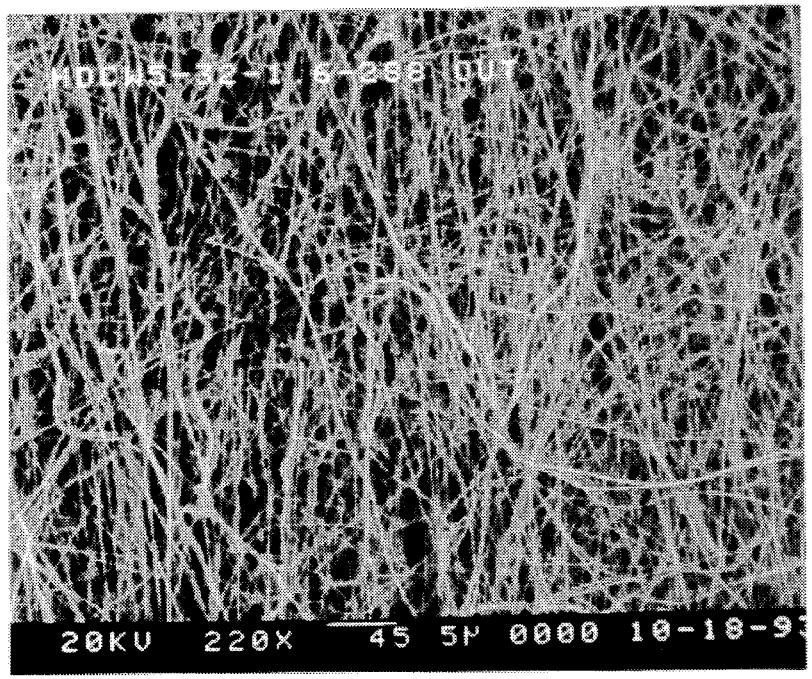
FIG. 7 is a scanning electron micrograph (220×) of a melt-blown fibrous nonwoven web prepared in accordance with the present invention.

A scanning electron micrograph of the product at 220× is shown in FIG. 7, in which the machine direction is horizontal. The fibers are predominantly oriented about equally to the left and right of vertical in the cross machine direction, each making an approximate angle of 10° to 15° to the vertical. Also notable in FIG. 7 is the relative absence of roping, twinning, and shot which characterize hitherto made melt-blown media.

Tensile tests were run with the following results:

| | MD | CMD |
|---|---|---|
| Tensile Strength, kg/linear cm: | 1.67 | 7.5 |
| Elongation, %: | 49 | 12 |

The ratio for the CMD/MD of tensile strengths is 4.5, reflecting the fiber orientation seen in FIG. 7.

Example 8

A sheet of PBT resin was prepared in the manner of example 3. Specimens were cut to 0.5×7 cm, five each in the MD and the CMD. Each of the ten specimens was then dipped into water at one end to a depth of about 0.3 cm, and the time was observed for the water to rise 2 cm. The average machine direction time was 15.9 seconds, and the average time in the cross machine direction was 9.6 seconds. These data reflect the fiber orientation of the sheet; the rate of capillary diffusion is greater in the CMD, which is the predominant direction of fiber orientation.

Examples 9–16

The apparatus of example 7 and procedures similar to those of example 7 were used with polypropylene resin to prepare examples 9–16. The machine settings and the resulting average fiber diameters are presented in Table II. The sheet weight was the same for all of the examples, namely 0.043 g/cm². The fiber diameters varied from 1.4 to 15 µm. All the products were uniform on light box inspection.

fibers. The arithmetic average, $\Sigma nd_i/\Sigma n$ hereinafter referenced as the average fiber diameter, is about 10% lower.

TABLE II

| Example No. | Resin Temp. (°C.) | Air Temp. (°C.) | Air Pressure (kg/cm²) | DCD (cm) | Mandrel (rpm) | Translation Rate (cm/rev) | Resin Rate (g/min/nozzle) | Thickness (cm) | Voids Volume (%) | Average Fiber Diameter (µm) |
|---|---|---|---|---|---|---|---|---|---|---|
| 9  | 318 | 335 | 1.54 | 3.8 | 260 | 0.17 | 0.22 | 0.31 | 84.6 | 1.4 |
| 10 | 318 | 335 | 0.98 | 4.1 | 260 | 0.18 | 0.23 | 0.24 | 80.1 | 1.9 |
| 11 | 318 | 335 | 0.63 | 4.1 | 260 | 0.18 | 0.23 | 0.22 | 78.2 | 2.2 |
| 12 | 318 | 335 | 0.53 | 4.1 | 260 | 0.18 | 0.23 | 0.21 | 77.2 | 3.4 |
| 13 | 313 | 321 | 0.42 | 7.6 | 230 | 0.29 | 0.33 | 0.31 | 84.6 | 5.2 |
| 14 | 313 | 329 | 0.32 | 7.6 | 230 | 0.29 | 0.33 | 0.31 | 84.6 | 7.9 |
| 15 | 313 | 329 | 0.21 | 7.6 | 230 | 0.29 | 0.33 | 0.31 | 84.6 | 10.6 |
| 16 | 313 | 329 | 0.18 | 7.6 | 415 | 0.31 | 0.63 | 0.27 | 82.3 | 15.1 |

Evaluation Of Fiber Diameter

The specimens of commercially available melt-blown media which have been examined have all had fiber diameter distributions such that the ratio of the largest diameter to the smallest is greater than ten. Using optical or scanning electron microscopy to accurately determine the average fiber diameter of such media is extremely difficult, if not impossible. Counting fibers by identifying individual fibers and measuring their diameter is easy when the range is small, for example when the largest fiber is less than about two to four times the diameter of the smallest; however, it is very difficult when the range is ten or more to one. In typical commercially available media, the same fibers run off the photo and then perhaps back on again, or down into the depths below the focal depth of an optical or scanning electron microscope and then perhaps up again. For these reasons, estimates of fiber diameter made by conventional melt-blowing have stated a range, for example 1 to 10 µm. In such a report a single 10 µm diameter fiber should be assigned a weight for averaging purposes 100 times that of a 1 µm fiber, and thus the sighting of one or two 1 µm diameter fibers has little impact.

In practice, it has been easy to make a product "containing 1 µm fibers", but the average diameter of all of the fibers has been many times larger, for example 5 or more times the diameter of the smallest fiber. The products of the present invention have fiber diameter ranges which are less than one third those of conventional media, permitting average fiber diameters to be determined with a precision estimated to be about ±5% by measuring the diameters of 100 fibers.

The evaluation of the mean diameter of fibers as reported herein has unless otherwise noted been accomplished using scanning electron microscopy to determine the diameter of at least 100 fibers using several fields, each of which typically contained about 20 to 30 fibers. Each fiber counted was identified and its diameter noted on the photo. Where necessary to establish the diameters of the finest fibers, magnifications of up to 2000× were used. Averages were computed as the root mean square (RMS), i.e., $$\text{RMS average diameter} = \left( \frac{\Sigma nd^2}{\Sigma n} \right)^{1/2}$$

wherein n is the number of fibers and d is the individual fiber diameter. This formula takes into account the greater contribution to weight and surface area by the larger diameter fibers. The arithmetic average, $\Sigma nd_i/\Sigma n$ hereinafter referenced as the average fiber diameter, is about 10% lower.

Fiber surface areas were when required calculated as $$\text{Surface area, m}^2/\text{g} = \frac{4}{\text{RMS diameter, µm} \times \rho}$$

where ρ is the density in g/cc of the resin of which the fibers are composed.

Using this method for the evaluation of fiber diameter the procedure of the invention is capable of manufacturing PBT (polybutylene terephthalate) and polypropylene media with RMS average fiber diameters of about 1 µm or less, as is shown by examples 3, 4, 5 and 7. At the other end of the scale, uniform media comprising 30 µm and larger diameter fibers have been made.

A survey of manufacturers of melt-blown fiber in the USA, Europe, Asia, and the Americas turned up thirteen manufacturers who offer melt-blown web for public sale. A sample of the smallest diameter fiber produced was requested from each, a request to which nine responded. Those samples which claimed to have average fiber diameter of 3 µm or less were evaluated by using gas adsorption at 80° C. (the BET method) and calculating the average fiber diameter. None were smaller in average fiber diameter than 1.8 µm, and most were larger than 3 µm.

Evaluation Of The Voids Volume

The data required to determine voids volume include the weight of the sheet per unit area, the density of the fiber, and the thickness of the sheet. Measurement of thickness is not straightforward because the media are compressible, which can cause large errors if inappropriate equipment is used. Thickness gauges were used in which a 7.62 cm diameter aluminum foot is attached to a gauge with 0.0001 inch (0.00025 cm) graduations. The gauge with its foot is mounted on a horizontal U shaped frame comprising on its lower arm a flat surface against which the foot rests. The gauge foot was actuated downward by a 60 gram force spring, which together with the 80 gram weight of the foot exert a compressive force on the test specimen of 140 grams, or 3.1 g/cm². This force compresses even the loftiest and most easily compressed of the media of the invention by less than about 1%.

The voids volume was then calculated in % as $$\% \text{ voids} = (t - W/\rho) t^{-1} \times 100$$

where t=thickness (cm), W=weight (g/cm²), and ρ=density of the fiber (g/cc).

Multilayered Products

Although the present inventive bag filter is preferably prepared from a single layer of filter media, the bag filter of the present invention can be prepared from a multilayered material wherein at least one of the layers desirably comprises the highly uniform melt-blown fibrous nonwoven web described above. The fibrous web may be bonded to a support surface by using the scanning method of the present invention to deposit on one or both surfaces as the bonding agent a low melting resin of fibrous form. Preferably the resin has a glass transition temperature well below ambient temperature and a melting or softening point below those of the materials to be bonded. Polyethylene and PETG are examples of low melting bonding resins which may be used to bond PBT, nylon, polyethylene terephthalate, and other solid and porous materials.

The low melting resin is fiberized using the scanning method of the invention with the resin delivery and scanning rates adjusted to deposit preferably about 1 to 20 g/m² of bonding fiber about 2 to about 10 μm in fiber diameter, or more preferably about 2 to 5 g/m² of bonding fiber about 3 to about 7 μm in diameter. The bonding fibers are impinged on either or both of the surfaces to be attached.

When the binder fiber has been deposited on the surface or surfaces to be bonded the next step is a short exposure to gentle compression with sufficient heat, preferably applied to the side which is thinner and/or has higher thermal conductivity, to attain a temperature above the melting point of the binder fiber. Heat is preferably maintained for a short time, for example for less than 10 seconds, thereby preventing loss of the molten binder fiber, which if exposed to heat for a long period might migrate into the porous medium due to its capillarity, thereby reducing the affectivity of the bond.

The fiber diameters and the weight per unit area of the binder fiber are preferably such so as to cover between about 1 to 30% of the area of the surface to which the binder fiber is applied, and preferably between about 1 and 10% of the surface, and more preferably between about 2 and 5 percent of the surface, with the more preferred range leaving about 95 to 98% open the surface on which the binder fiber is deposited. In this manner, the two layers are well adhered to each other, and, because only gentle compression has been used, the two layers need not have been significantly reduced from their starting thicknesses or indeed not reduced at all.

Figure 8:
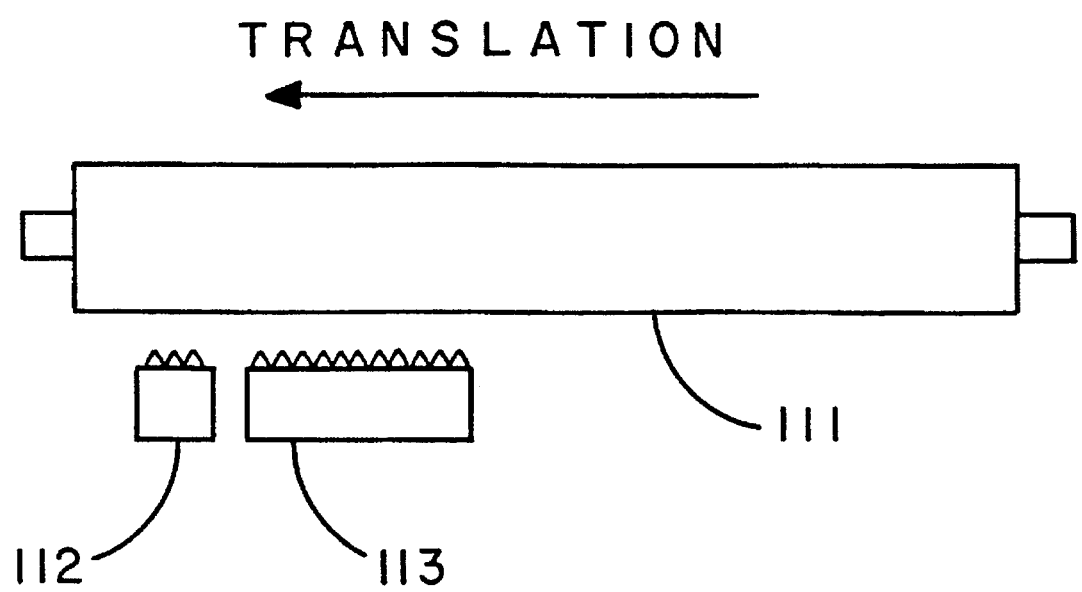
FIG. 8 is a side view of a melt-blowing apparatus useful in the preparation of laminates in accordance with the present invention.

In a preferred method for accomplishing the bonding of two layers, the binder fiber is deposited on the porous medium in the same operation in which the porous medium is formed, using an arrangement such as that shown in FIG. 8, in which the smaller of the two fiberizers 112 and 113 deposits binder fiber on a porous medium of the invention as it is being formed on the collector cylinder 111, all during a single traverse of the target cylinder 111 as it travels in the direction of the arrow.

Uniformity Of The Products Of The Invention

The methods of web production make possible a bag filter having a uniformity better than has been achieved previously by a melt-blowing process.

Among the tests which may be used to define uniformity of melt-blown products are: uniformity of fiber diameter; freedom from roping, in which pairs or triplets of fibers are twisted about each other; freedom from twinning, in which pairs of fibers are joined to each other along their length; a relatively narrow range of fiber diameter; and, most importantly, uniformity of weight and thickness from one part of the web to another.

Products which are closer to uniformity in fiber diameter perform better when compared with less uniform products, because their pore sizes are more uniform, by virtue of which, when used for filtration, they retain finer particles more efficiently and pass filtered liquid with lower pressure drop. Roping and twinning effectively increase fiber diameter and cause fiber size distribution to be less uniform, hence are undesirable. Filters which are heavier or thicker from one place to another perform less efficiently because the thinner portions are less efficient with respect to particle removal, and the thicker portions increase the pressure drop generated by the passage of water through the filters. Non-uniform media perform poorly when used in diagnostic devices when used for lateral flow transfer of liquids.

Examples—Uniformity Evaluation

The following examples illustrate the highly uniform nature of the preferred melt-blown fibrous nonwoven medium which is used to prepare the bag filter of the present invention.

Example 17

Figure 9:
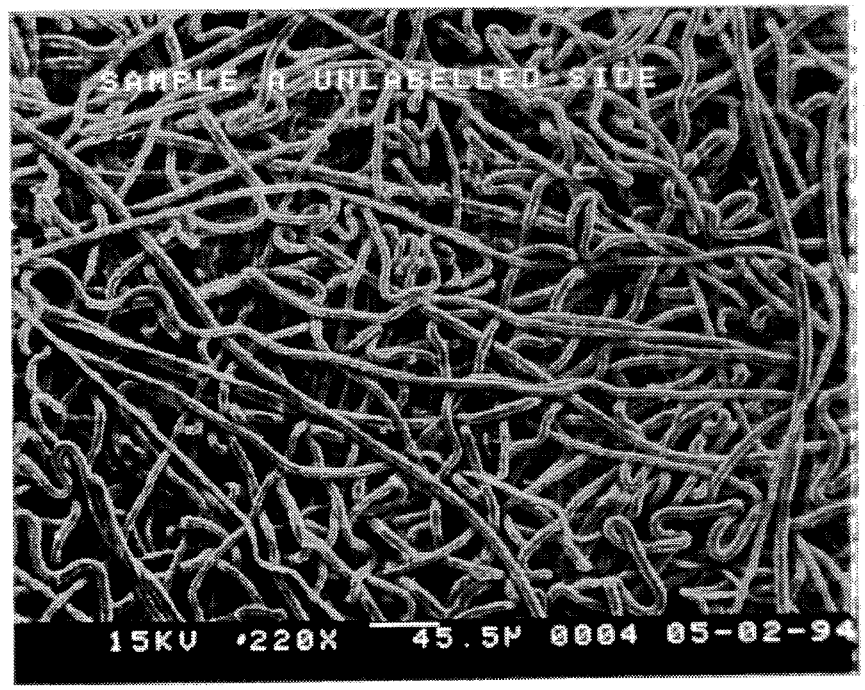
FIG. 9 is a scanning electron micrograph (220×) of a melt-blown fibrous nonwoven web prepared in accordance with the present invention.

A porous sheet 45×100 cm was prepared using the crossed fiber streams and the scanning system of the present invention with 3.2 cm of vacuum applied at connection 62 in FIG. 6, using a 0.13 cm diameter air nozzle and air pressure of 0.5 kg/cm², PBT resin rate 0.51 g per minute per nozzle of resin at 302° C., and a DCD of 4.1 cm; thickness was 0.020 cm, and weight was 0.0054 g/cm². An SEM of this specimen is shown in FIG. 9 at 220×. The diameters of all of the fibers shown on this photo and on three photos of neighboring areas were measured. More than 95% of the fibers were within the range of 3.5 to 7.7 μm diameter, i.e., a ratio of 1:2.2, which is a remarkably narrow fiber diameter range for a melt-blown product. The narrow fiber diameter range of the product made it practical and fast to determine the RMS average diameter by microscopy to be 5.9 μm with a standard deviation of 1.4 μm. Other examples of the present invention were similarly evaluated, and the results summarized in Table III.

Example 18

A porous fibrous sheet 45×100 cm was prepared using the crossed fiber streams and the scanning system of the present invention in the manner described for example 17 except that the air nozzle diameter was 0.11 cm diameter, the air pressure was 1.4 kg/cm², and the DCD was 3.3 cm. The fiber diameter characteristics are shown in Table III.

Example 19

A porous fibrous sheet was prepared in a manner identical to example 18 except that the air pressure was 1.06 Kg/cm². The fiber diameter characteristics are shown in Table III.

TABLE III

| Porous Medium Example Number | 90% of the Fibers in diameter range (μm) | Ratio max/min | Average fiber diameter, μm (arithmetic) |
| --- | --- | --- | --- |
| 1 | 2.5–6.2 | 2.50 | 4.0 |
| 3 | 0.5–1.6 | 3.2 | 0.9 |
| 6 | 0.6–1.6 | 2.67 | 1.1 |
| 9 | 0.9–2.5 | 2.78 | 1.4 |
| 10 | 1–3 | 3.00 | 1.9 |
| 14 | 5–12 | 2.40 | 7.9 |
| 15 | 6.5–15 | 2.30 | 10.6 |
| 17 | 3.5–7.7 | 2.20 | 5.9 |
| 18 | 4.2–7.7 | 1.83 | 5.9 |
| 19 | 6.4–10.1 | 1.58 | 8.1 |

Example 20

Figure 10:
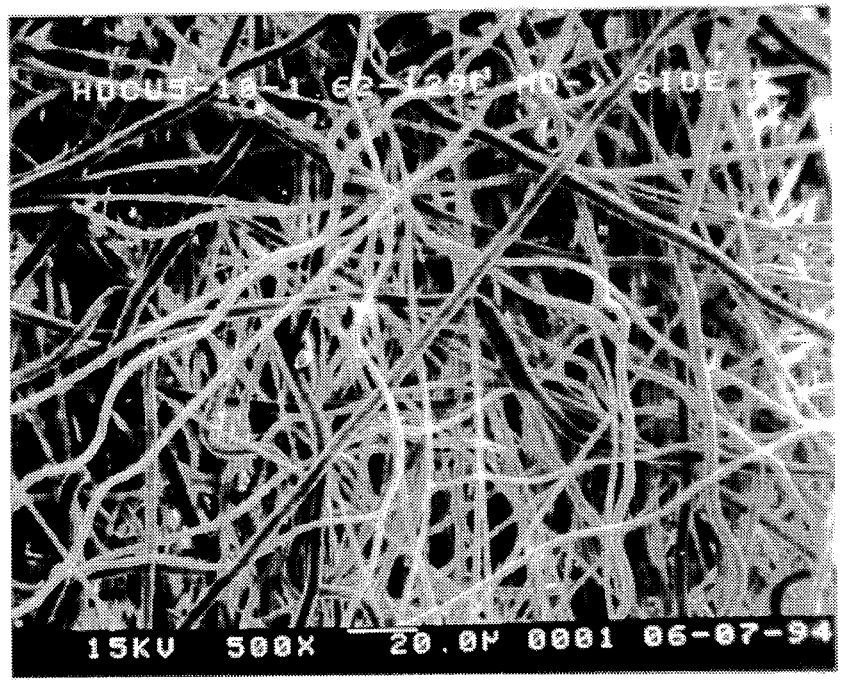
FIG. 10 is a scanning electron micrograph (500×) of a melt-blown fibrous nonwoven web prepared in accordance with the present invention.

The specimen in example 20 was prepared in the same manner as in example 17 except that the air nozzle diameter was 0.17 cm, the air pressure was 0.74 kg/cm², and the resin temperature was 304° C. The resulting product is shown in the SEM of FIG. 10 at 500×. Compared with FIG. 9, FIG. 10 appears at first glance to be less uniform. On analysis, a count of 100 fibers showed 39% of the fibers (those seen in the foreground) to be in the diameter range of 2.5 to 4.5 μm, with an average diameter of 4.2 μm, and the remaining 61%, in the lower plane of the SEM, were in the range of 1.1 to 2.3 μm, with an average diameter of 1.9 μm; only one fiber of the 100 counted was found between 2.3 and 2.8 μm, compared with 23 fibers between 2.2 and 2.3 μm and 27 fibers between 2.8 and 3.5 μm. This clearly establishes a bimodal distribution, which could be explained if the larger diameter fibers were assumed to travel directly from the fiberizer nozzles to the collector cylinder, whereas those of smaller diameter representing fibers which were diverted by the aerodynamics to travel a longer distance prior to contacting the collector cylinder are seen to be oriented, with their direction of travel and deposition being in the CMD. The two types of fibers are each within a diameter range max.:min. of approximately 2:1.

Example 21

Figure 11:
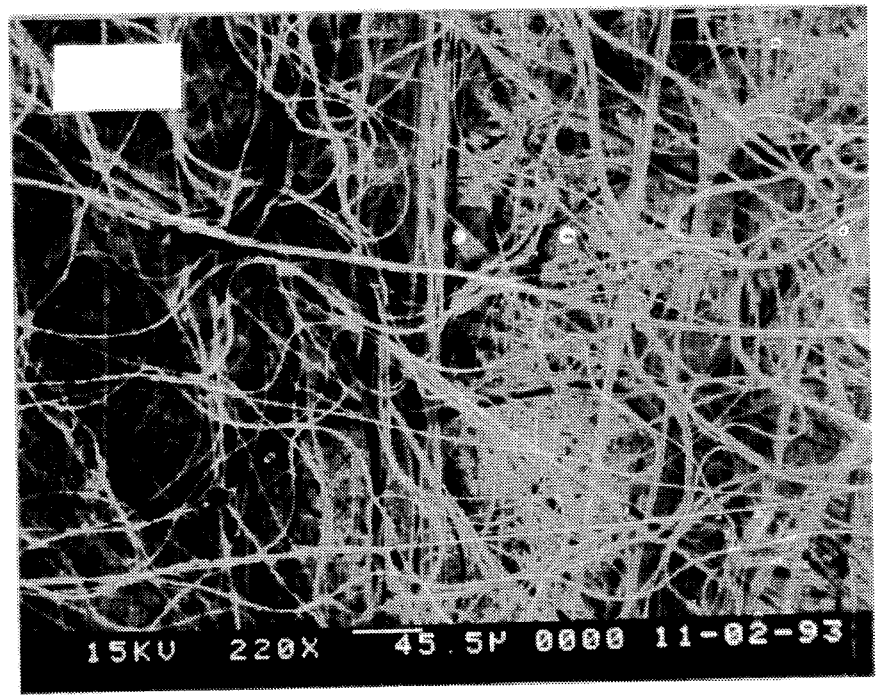
FIG. 11 is a scanning electron micrograph (220×) of a typical commercially available melt-blown fibrous nonwoven web.

Example 17 (FIG. 9) may be compared with the SEM of example 21 shown in FIG. 11, a typical commercial product, which has 90% of its fibers in the range between about 0.5 and 5 μm, i.e., a max/min ratio of 10:1, not counting the oddly shaped mass in the upper left quadrant of the picture. Note also the large number of twinned fibers, along with occasional light roping.

Example 22

Direct measurement of weight uniformity was accomplished by cutting 1" squares from test sheets. In one such test a 0.0064 g/cm² polypropylene sheet made using the process of the invention was cut along its 96 cm length to provide 91 2.540 cm squares representative of the length, or machine direction, of the sheet. Each square was weighed, and the linear average was calculated to be 0.0410 g/cm² with a probable error of 0 8%. Uniformity in the cross-machine direction of the 46 cm width of the sheet was similarly determined by cutting 39 2.540 cm squares in the cross machine direction; these were also 0.0410 g/cm² in average weight, with a probable error in the linear average of 0.7%. Of these probable error estimates, 0.2 to 0.3% or more may be due to errors in the dimensions of the cut squares.

Example 23

An alternate means to determine uniformity of weight was provided by the use of a β-ray backscatter instrument, Model 103, made by the NDC Systems of 730 East Cypress Avenue, Monrovia, Calif. This instrument is fitted with a 0.64 cm diameter lens through which a controlled beam of β-radiation is passed. The lens is surrounded by a 3.5 cm diameter peripheral back-scatter collection system. The quantity of backscattered radiation is, when averaged, proportional to the weight per unit area of the sheet. The instrument is fitted with a recording system and with means to scan the lens assembly at a uniform rate, for example at 1.3 cm/second, over the surface of the sheet of which the weight is to be measured. The sheet of which the measurement is made must be suspended from its edges in a manner such that no metal is less than about 10 cm distant from the lens.

As described herein, the scanning was accomplished by a simple pass at 1.3 cm/second in one direction over the sheet to be tested with the concentric lens assembly in light contact with the surface of the sheet. The recorder measures the numbers and intensity of the individual backscattered β-rays and averages their energy over a ten second period, providing a continuous line on the recorder chart. The accuracy of the system is such that when the sensor is repeatedly exposed to the identical cycle the recorded signal may vary on average by about ±0.5%.

Figure 12:
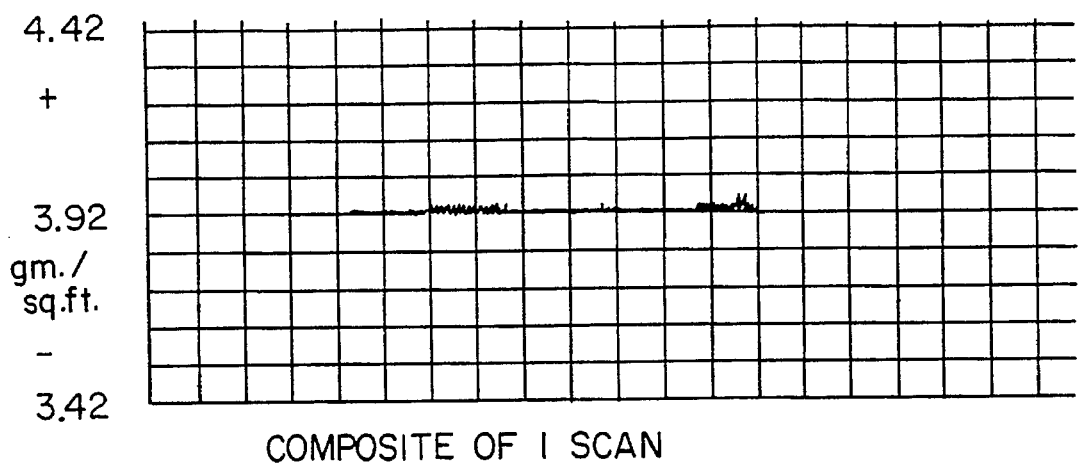
FIG. 12 depicts a β-ray backscatter record in the cross-machine direction for a melt-blown fibrous nonwoven web prepared in accordance with the present invention.
Figure 13:
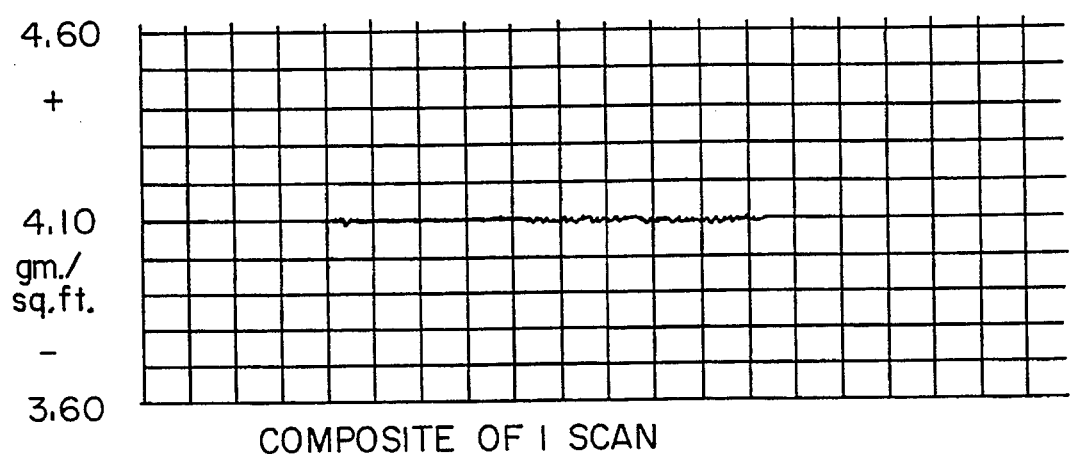
FIG. 13 depicts a β-ray backscatter record in the machine direction for the same melt-blown fibrous nonwoven web prepared in accordance with the present invention as is the subject of FIG. 12.

FIGS. 12 and 13 show the records obtained when a typical fibrous product is scanned in the cross-machine direction and in the machine direction, respectively. In FIG. 12 the maximum deviation from the mean weight is (3.96–3.91)/2 or 0.025 grams/sq. ft. (0.27 g/m²), in a sheet weight of 3.94 grams/sq. ft. (42 g/m²), hence with a maximum deviation from the mean of 0.64%. Maximum deviation in the machine direction is shown in FIG. 13 to be 0.26%.

Example 24

A typical highly uniform melt-blown fibrous nonwoven web in the form of a 50×100 cm sheet with 85% voids volume was tested to determine its thickness 48 places on 10 cm centers. The mean thickness was 0.027 cm, the standard deviation was 0.7%, and the probable error was 0.4%, indicating a thickness uniform to within 1%.

Bag Filter Construction

Bag filters may be constructed from a tubular web by sealing one end and by optionally attaching a collar, or from a sheet web by sealing the adjoining portions into a tubular configuration, e.g., a cylinder, and then sealing one end of the tubular configuration followed by, optionally, attaching a collar to the other, open end. Any of the known means of sealing the side seam (if existing) and end seam, as well as of attaching the optional collar, can be used in conjunction with the highly uniform melt-blown fibrous nonwoven web described above.

For example, a bag filter constructed from a sheet web with both a side seam and an end seam can be prepared by folding over a sheet of the fibrous nonwoven web to form a tube and then sewing together the adjoining portions with a needle and thread. The material, size, and nature of the thread which can be used to join fibrous nonwoven web portions to form the bag filter depends upon the fibrous nonwoven web, the other materials which can be used to form the bag filter, and the ultimate use of the bag. The thread preferably is of the same material as the fibrous nonwoven web.

The number of stitches/cm used to join the fibrous nonwoven web portions of the bag filter will vary with the fibrous nonwoven web, the number of layers of fibrous nonwoven web or other materials, the thread, the type of stitching, and the ultimate use of the bag filter. It is important that sufficient stitches be employed to ensure an adequate mechanical bond between adjoined fibrous nonwoven web portions, while, however, ensuring that the number of stitches/cm is not such that the stitching results in the undue perforation or weakened integrity of the fibrous nonwoven web.

The manner in which the seam on the bag filter is sewn can be varied. For example, the seam can be straight-stitched, with a binder strip preferably inserted between the edges of the fibrous nonwoven web prior to sewing the seam, or the seam can be over-stitched. When used, the binder strip is preferably of the same type of material as the fibrous nonwoven web and/or thread.

Depending upon the nature of the fluid being filtered and the pressure at which filtration is being effected, it may be desirable to additionally seal the seams of the bag filter with a thermoplastic tape that has been heat-sealed to the adjoining fibrous nonwoven web portions. Any suitable thermoplastic tape can be used, preferably a thermoplastic tape which has a melting temperature lower than the melting temperature of the fibrous nonwoven web and/or thread of the bag filter and which will provide a suitable seal with the adjoined fibrous nonwoven web portions. A polyester fibrous nonwoven web, for instance, will be sealed preferably with a polyester copolymer thermoplastic tape having a melting temperature below that of the polyester fibrous nonwoven web.

It should be kept in mind that the choice of thermoplastic tape will depend in part upon the amount of heat and pressure that can be applied to the thermoplastic tape on the fibrous nonwoven web to effect the heat-seal without disrupting the integrity of the bag filter. The choice of thermoplastic tape also will depend on the ultimate use of the bag filter. For example, the bag filter may be used under conditions that may adversely affect the heat-seal effected between the thermoplastic tape and the fibrous nonwoven web, in which case it will be necessary to choose an appropriate thermoplastic tape to withstand the anticipated operating conditions.

Another consideration in the choice of the thermoplastic tape is its width. The width of the tape must be sufficient to effectively seal the seam. The thermoplastic tape can be applied to either the inside or the outside surface of the bag filter. Alternatively, or in addition, the thermoplastic tape can be inserted between the adjoining fibrous nonwoven web portions prior to stitching them together. It is preferred that the thermoplastic tape be applied to cover the seam on the outside surface of the bag filter. The thermoplastic tape is preferably positioned such that the seam is midway between the edges of the tape. Furthermore, the thermoplastic tape preferably extends beyond the ends of the seam to the extent necessary to assure that flow through the openings caused by sewing and thence edgewise under the tape not be of a magnitude which compromises the desired filtration efficiency.

Once the thermoplastic tape has been properly positioned with respect to the seam, the thermoplastic tape is subjected to sufficient heat and pressure to effect a heat-seal between the thermoplastic tape and the adjoining fibrous nonwoven web portions. The amount of heat and pressure required to heat-seal the tape will depend in part on the particular thermoplastic tape and fibrous nonwoven web used in the bag filter. The applied heat and pressure, of course, should not be so great as to destroy the integrity of the bag filter. In the preferred embodiment wherein a polyester copolymer thermoplastic tape is utilized, hot air can be used to heat the thermoplastic tape on the bag filter which is then passed through rollers to effect the heat-seal.

As an alternative to the use of a thermoplastic tape in conjunction with sewing, or in lieu of both sewing and the use of the thermoplastic tape, the edges of the fibrous nonwoven web portions can be joined by thermally sealing. In thermally sealing the fibrous nonwoven web to itself, care should be taken so as to ensure a sufficiently strong seal between the adjoining edges of the fibrous nonwoven web portions, while not unduly adversely affecting the structural integrity of the bag filter. The thermal sealing can be effected by any suitable technique, such as by way of heat sealing or ultrasonic welding.

A seam can be also sealed by joining the edges of the fibrous nonwoven web portions by an overmolding technique. The overmolding technique involves the injection molding of a thermoplastic polymer onto the adjoining portions of the fibrous nonwoven web, such that the polymer penetrates the fibrous web at the adjoining portions and provides a fluid-tight seal. Such a technique can be used in addition to, or more preferably in lieu of, a sewn or thermally sealed seam, and, moreover, is applicable to either side seams or end seams.

The present inventive bag filter can be of any suitable configuration and size. Conventional bag filters are roughly cylindrical in shape and are available in sizes of 4 and 7 inch (10 and 18 cm) diameter and 9, 15, 17, and 33 inch (23, 38, 43, and 84 cm) length.

The bag filter can comprise one or more layers of the fibrous nonwoven web. When two or more fibrous nonwoven web sheets are layered, the fibrous nonwoven web sheets can have the same or different pore ratings. Preferably, multiple-layered fibrous nonwoven web sheets include filter media having generally decreasing pore size in the direction of fluid flow, most typically from the inside to the outside of the bag filter. The bag filter can comprise other layers in addition to the filter sheet material, such as an inner liner and outer wrap of a nonwoven material.

The bag filter can be formed from one or more single or multiple-layered sets of sheets of fibrous nonwoven web. The number of such sheets employed will depend in part upon the ultimate shape of the bag filter and its use. In most instances, a bag filter can be prepared with only one or two fibrous nonwoven web sheets which will desirably minimize the extent of seams. Most preferably, the bag filter is constructed from a single sheet of fibrous nonwoven web, thereby resulting in the existence of only a single seam joining the edges of the sheet so as to leave an open end. In all cases, the overall shape of the bag filter should be such that a particular seam or area of a seam is not subjected to added stress through use that would destroy the integrity of the seam. Most preferably, the bag filter is formed from a tubular web, rather than a sheet web, such that a side seam is avoided.

A fibrous nonwoven web typically has a relatively smoother side and a relatively rougher side, with the smoother side generally being the side of the nonwoven web which contacted the collection surface during manufacture. While either side can be oriented toward the outside of the bag filter, it is preferred that the smoother side be so oriented. When the nonwoven web is formed into a tubular configuration during the manufacture of the nonwoven web, e.g., by melt-blowing fibers onto a rotating mandrel, the surface of the nonwoven web contacting the mandrel will be somewhat smoother, and the nonwoven web, therefore, is preferably turned inside out to expose the smoother surface to the outside. The smoother outside surface reduces the abrasion effect of the bag filter on the filter housing components surrounding the bag filter.

A suitable collar can be adhered to the open end of the bag filter by any suitable means. In general, the collar can be sewn onto the bag filter, with the resulting seam being treated as described above with respect to adjoining fibrous nonwoven web portions, or can be formed by an overmolding technique which involves putting the open end or the neck of the filter bag and the collar together and directing a thermoplastic elastomer at the region where the neck and the collar are joined together. Alternatively, the collar can be injection molded directly onto the neck of the filter bag.

The collar can be of any suitable material, generally an elastomeric compound of the same general type as used in the fibrous nonwoven web. An example of a thermoplastic elastomer that is suitable as a collar material is Santoprene® rubber sold by Advanced Elastomer Systems. Examples of polyester copolymer materials suitable as collar materials are Geolast® and Alcryn® 2060 NC (both available from DuPont).

If a collar is attached to the open end of the bag filter, care should be exercised in choosing the stitch length to ensure that the collar is not perforated (to the extent the collar is secured to the bag filter by stitching). Similarly, if a thermoplastic tape is used to seal the collar seams, then care should be exercised in choosing the thermoplastic tape so that the thermoplastic tape effectively heat-seals to both the fibrous nonwoven web and the collar. If, in addition to or in lieu of sewing, the collar is thermally sealed to the open end of the bag filter, i.e., directly melt-bonded to the fibrous nonwoven web of the bag filter, then care should be taken to ensure that a satisfactory bond develops and that the structural integrity of the bag filter is not unduly compromised.

Illustrative Bag Filter Uses

The bag filter of the present invention has a variety of suitable end uses and can be generally used in all applications in which conventional bag filters are currently being used, as well as more demanding applications in view of the superior nature of the present inventive bag filter.

For example, the present inventive bag filter can be used to filter paints and coatings, especially hydrocarbon-based paints and primers, chemicals, petrochemical products, and the like. The present inventive bag filter, particularly a polyester bag filter, is suitable for filtering fluids containing aromatics such as benzene, toluene, xylene, gasoline, and kerosene, aliphatics such as hexane and octane, fats, oils, and freons, as well as other compounds. The present inventive bag filter can be used for filtering aluminum processing fluids, such as roll mill coolant fluids, which contain aromatic solvents. The present inventive bag filters are also well suited for use in high oxidative conditions, such as may be encountered in processing liquid fluids containing oxidants, as well as dry air or other oxidizing gaseous fluids, particularly at elevated temperatures.

The utility of the bag filter is in no way limited to these uses and includes most uses for conventional bag filters. In accordance with this invention, a method of treating, e.g., filtering, a fluid using the bag filter of the present invention is also disclosed, which method comprises passing the fluid to be treated through the present inventive bag filter. Typically, such fluid flow will be from the inside of the bag filter to the outside of the bag filter.

All of the references cited herein, including patents and patent applications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A bag filter comprising a melt-blown fibrous nonwoven web formed into a bag configuration with a closed end, an open end, an inside surface, and an outside surface, wherein said fibrous nonwoven web comprises fibers such that 90% of the fibers have a diameter ranging from a minimum fiber diameter to a maximum fiber diameter which is no more than about three times the minimum fiber diameter.

2. The bag filter of claim 1, wherein 90% of the fibers have a diameter ranging from a minimum fiber diameter to a maximum fiber diameter which is no more than about two times the minimum fiber diameter.

3. The bag filter of claim 1, wherein said fibers have an average fiber diameter of less than about 2 µm.

4. The bag filter of claim 3, wherein said fibers have an average fiber diameter of less than about 1.5 µm.

5. The bag filter of claim 4, wherein said fibers have an average fiber diameter of less than about 1 µm.

6. The bag filter of claim 1, wherein said fibrous nonwoven web is characterized by a weight distribution varying by less than 1% when measured in both the longitudinal and transverse directions, said weight distribution measured along 0.64×13 cm areas and on 2.54 cm squares.

7. The bag filter of claim 1, wherein said fibrous nonwoven web is substantially free of roping, twinning, and shot.

8. The bag filter of claim 1, wherein said fibrous nonwoven web is characterized by a tensile strength in a first direction at least about 1.5 times the tensile strength in a second direction 90° to the first direction, and said fibrous nonwoven web is oriented in said bag filter having a circumferential direction and a longitudinal direction such that said first direction of said fibrous nonwoven web is in said circumferential direction of said bag filter and said second direction of said fibrous nonwoven web is in said longitudinal direction of said bag filter.

9. The bag filter of claim 8, wherein said fibrous nonwoven web is characterized by a tensile strength in a first direction at least about 2 times the tensile strength in a second direction 90° to the first direction.

10. The bag filter of claim 9, wherein said fibrous nonwoven web is characterized by a tensile strength in a first direction at least about 4 times the tensile strength in a second direction 90° to the first direction.

11. The bag filter of claim 1, wherein said bag filter has one or more seams which are sewn and heat-sealed with a thermoplastic tape.

12. The bag filter of claim 1, wherein said bag filter has one or more seams which are thermally sealed.

13. The bag filter of claim 1, wherein said bag filter further comprises a collar secured to said open end of said bag filter.

14. The bag filter of claim 1, wherein said bag filter has a side seam which is sealed with an injection-molded thermoplastic elastomer.

15. The bag filter of claim 1, wherein said bag filter has no side-seam.

16. The bag filter of claim 15, wherein said bag filter has an end closure seam which is sewn, heat-sealed with a thermoplastic tape, or thermally sealed.

17. The bag filter of claim 15, wherein said bag filter has an injection-molded thermoplastic elastomer end closure.

18. The bag filter of claim 17, wherein said bag filter further comprises an injection-molded thermoplastic elastomer collar secured to said open end of said bag filter.

19. The bag filter of claim 1, wherein said fibrous nonwoven web comprises a polymer selected from the group consisting of polybutylene terephthalate, polyethylene terephthalate, polypropylene, polyethylene, polymethylpentene, polychlorotrifluoroethylene, polyphenylsulfide, poly(1,4-cyclohexylene dimethylene terephthalate), PETG, nylon 6, nylon 66, nylon 612, nylon 11, and nylon 6-polyethylene-oxide-diamine copolymer.

20. The bag filter of claim 19, wherein said fibrous nonwoven web comprises polyethylene, polypropylene, polyethylene terephthalate, polybutylene terephthalate, or PETG.

21. The bag filter of claim 20, wherein said bag filter further comprises a collar comprising a polyester copolymer or thermoelastomeric rubber.

22. A bag filter of claim 20, wherein said fibrous nonwoven web has a critical wetting surface tension of at least about 70 dynes/cm.

23. A bag filter comprising a melt-blown fibrous nonwoven web formed into a bag configuration with a closed end, an open end, an inside surface, and an outside surface, wherein said bag filter has no side seam and has an injection-molded thermoplastic elastomer end closure.

24. The bag filter of claim 23, wherein said bag filter further comprises an injection-molded thermoplastic elastomer collar secured to said open end of said bag filter.

25. The bag filter of claim 24, wherein said fibrous nonwoven web comprises a polymer selected from the group consisting of polybutylene terephthalate, polyethylene terephthalate, polypropylene, polyethylene, polymethylpentene, polychlorotrifluoroethylene, polyphenylsulfide, poly(1,4-cyclohexylene dimethylene terephthalate), PETG, nylon 6, nylon 66, nylon 612, nylon 11, and nylon 6-polyethylene-oxide-diamine copolymer.

26. The bag filter of claim 25, wherein said fibrous nonwoven web is prepared from polyethylene, polypropylene, polyethylene terephthalate, polybutylene terephthalate, or PETG.

27. The bag filter of claim 26, wherein said collar comprises a polyester copolymer or thermoelastomeric rubber.

28. A method of treating a fluid comprising passing a fluid through the bag filter of claim 1.

29. A method of treating a fluid comprising passing a fluid through the bag filter of claim 23.

* * * * *